US010154650B2

(12) United States Patent
Reeves

(10) Patent No.: US 10,154,650 B2
(45) Date of Patent: Dec. 18, 2018

(54) AQUATIC RACE ASSEMBLY FOR CANINES

(71) Applicant: Dueling Dogs LLC, Medina, OH (US)

(72) Inventor: Grant Reeves, Medina, OH (US)

( * ) Notice: Subject to any disclaimer, the term of this patent is extended or adjusted under 35 U.S.C. 154(b) by 243 days.

(21) Appl. No.: 15/057,404

(22) Filed: Mar. 1, 2016

(65) Prior Publication Data

US 2016/0255810 A1 Sep. 8, 2016

Related U.S. Application Data

(60) Provisional application No. 62/126,850, filed on Mar. 2, 2015, provisional application No. 62/255,137, filed on Nov. 13, 2015.

(51) Int. Cl.
*A01K 15/02* (2006.01)
(52) U.S. Cl.
CPC .................................. *A01K 15/02* (2013.01)
(58) Field of Classification Search
CPC .... A01K 15/02; A01K 15/021; A01K 15/027; A01K 11/006; A01K 5/0291; Y10T 29/49826
See application file for complete search history.

(56) References Cited

U.S. PATENT DOCUMENTS

| 1,733,069 | A | | 2/1927 | Naud et al. | |
|---|---|---|---|---|---|
| 1,965,287 | A | | 9/1933 | Heintz | |
| 3,899,167 | A | * | 8/1975 | Braunhut | A01K 15/027 119/245 |
| 4,523,204 | A | * | 6/1985 | Bovay | G07C 1/24 348/157 |
| 5,226,655 | A | | 7/1993 | Rickabaugh | |
| 5,639,084 | A | | 6/1997 | Kawasaki | |
| 5,812,049 | A | * | 9/1998 | Uzi | G07C 1/24 340/323 R |
| 5,901,961 | A | * | 5/1999 | Holland, III | G07C 1/22 273/445 |
| 6,109,213 | A | * | 8/2000 | Rebalko | A63K 1/02 119/422 |
| 7,146,935 | B1 | | 12/2006 | Donnelly | |
| 7,658,688 | B2 | | 2/2010 | Weidner | |
| 2007/0163365 | A1 | * | 7/2007 | Reed | G01L 1/205 73/862 |

(Continued)

OTHER PUBLICATIONS https://celloscorner.com/category/dock-diving/ , Nov. 24, 2014, 38 pages.*
Nov. 15, 2014 at 2014 DockDogs World Chapionships; YouTube; DockDogs; DockDogs Debuts New Discipline—Dueling Dogs; Nov. 18, 2014 published on YouTube, event occured in public on <http://www.youtube.com/watch?v=S6qJ16N2JXM>. (Year: 2014).*

(Continued)

*Primary Examiner* — Monica L Williams
*Assistant Examiner* — Michael A. Fabula
(74) *Attorney, Agent, or Firm* — Daniel Basov; Michael Pesochinsky

(57) ABSTRACT

An aquatic race assembly system and method of conducting canine races, which includes two lanes, separated by a partition and a platform with a start line, a predetermined distance from one end of the platform. The platform is positioned proximate to a body of water or a pool. A sensor is placed in each lane, to automatically monitor the dog's position at the start and sending a signal to the control system, which determines whether there was a false start. When a dog bites and pools the lure places at a set distance on the other end of the pool, the lure is disconnected from the control system, causing a signal with the timing information to be sent and processed.

20 Claims, 14 Drawing Sheets

(56) References Cited

U.S. PATENT DOCUMENTS

| | | | | |
|---|---|---|---|---|
| 2007/0292251 | A1* | 12/2007 | Reed | A01K 15/027 |
| | | | | 414/538 |
| 2007/0298853 | A1* | 12/2007 | Yu | A63K 3/02 |
| | | | | 463/6 |
| 2009/0033034 | A1 | 2/2009 | Jakubowski | |
| 2009/0185455 | A1* | 7/2009 | Medina-Brodsky | A63B 71/0686 |
| | | | | 368/107 |
| 2014/0035729 | A1* | 2/2014 | Hansen | B63B 22/16 |
| | | | | 340/10.1 |
| 2015/0184412 | A1* | 7/2015 | Mudunuri | E04H 4/145 |
| | | | | 4/505 |
| 2015/0273353 | A1* | 10/2015 | Coleman | A63H 18/02 |
| | | | | 472/85 |

OTHER PUBLICATIONS

"Dockdogs present Dueling Dogs," YouTube.com, 2015, retrieved from https://www.youtube.com/watch?v,=9H1mLWB4f8M, retrieved on Apr. 26, 2016, 4 pages.

"Dockdogs Rules and Policies, Version 1.9.15," DockDogs, Inc., 2015, retrieved from http://dockdogs.com/wp-content/uploads/2014/08/2015-Rules-and-Policies-1.9.15-Final.pdf.pdf, 45 pages.

"Dueling Dogs™ Rules & Policies," Dueling Dogs LLC, 2015, retrieved from https://duelingdogs.net/rules-policies/, retrieved on Nov. 5, 2015, pp. 1-7.

"Dueling Dogs™ Overview,"Fun guys, LLC, 2015, 4 pages.

International Search Report and Written Opinion for International (PCT) Patent Application No. PCT/US16/20194, dated May 20, 2016, 10 pages.

* cited by examiner

AQUATIC RACE ASSEMBLY FOR CANINES

CROSS-REFERENCE TO RELATED APPLICATIONS

This application claims priority under 35 U.S.C. § 119(e) to U.S. Provisional Patent Application No. 62/126,850, filed Mar. 2, 2015, and to U.S. Provisional Patent Application No. 62/255,137, filed Nov. 13, 2015. These applications are each incorporated by reference herein in their entireties.

FIELD

The present disclosure relates to an apparatus and method facilitating canine aquatics racing competitions. More specifically, the present disclosure relates to an aquatic race assembly for canines and a method of conducting an aquatic race for canines.

BACKGROUND

Dogs are naturally energetic and enjoy running, swimming, and retrieving objects. Similarly, dog owners enjoy working with their dogs as well as exhibiting the speed and agility of their dogs. Many dog owners like to brag that their dog is faster than other dogs, or can jump or swim faster than other dogs. However, without a standardized system to evaluate the performance of one dog compared to another, it is not possible to determine if one dog is actually faster than another dog.

Accordingly, there is an unmet need for an aquatic race assembly for dogs and a method of conducting an aquatic race for dogs.

SUMMARY

The present disclosure provides a novel aquatic race assembly for dogs. It is one aspect of the present disclosure to provide a modular aquatic race assembly for dogs. In one embodiment, the assembly includes a platform adapted to be positioned proximate to a body of water, two lanes, and an object or lure that the dogs race to and bite.

It is an aspect of the present disclosure to form at least two lanes for the assembly. Optionally, the two lanes may be indicated by a line or marker. For example, in one embodiment a line on an upper surface of the platform and within the water forms the two lanes. In another embodiment, the two lanes may be formed by different colors on the upper surface of the platform. In this manner, a first lane may have a first color and a second lane may have a second color.

Additionally or alternatively, a partition may be positioned at least partially between the two lanes. The partition may be formed of any type or combination of materials. In one embodiment, the partition marks a dividing line between the first lane and the second lane. The partition may not prevent movement of dogs from the first lane to the second lane. For example, the partition may comprise a single flexible member (such as, but not limited to, a rope or chain) or a linear member (such as a pipe, a bar, or similar elements).

In another embodiment, the partition is adapted to prevent movement of dogs from the first lane to the second lane. The partition may comprise a substantially planar material supported by vertical posts. The planar material may be flexible or generally rigid. For example, the partition may be made of planar materials such as, but not limited to glass, plexiglas, rigid plastic, or flexible plastic sheeting. In one embodiment, the partition is at least partially transparent or translucent. Optionally, in another embodiment, the partition may include a plurality of ropes or a net. In one embodiment, the partition positioned in the water comprises a rope proximate to the water surface. Optionally, the rope may be supported in a position proximate to the water surface by at least one float.

Additionally or alternatively, the partition may comprise a plurality of vertical posts. Optionally, horizontal rails, a rope, or sheets of the planar material may be positioned between the posts. In another embodiment, the posts are closely spaced together such that a dog may not pass therebetween. Said another way, in one embodiment, the partition comprises a number of vertical posts with a spacing that prevents a dog from crossing from the first lane to the second lane of the platform.

The platform has a predetermined length and width. A starting area is formed in a predetermined portion of the platform. In one embodiment, the starting area is approximately 2 feet wide. In another embodiment, a first side, or starting line, of the starting area is positioned approximately 20 feet from an end of the platform proximate to the water. A second side of the starting area is positioned approximately 2 feet from the starting line and approximately 22 feet from the end of the platform proximate to the water.

The platform is positioned a predetermined height above the water surface. In one embodiment, the end of the platform proximate to the water is from about 6 inches to about 36 inches above the surface of the water. In another embodiment, the platform is approximately 2 feet above the surface of the water.

In one embodiment, the body of water is held in a container. The container may be of any shape, size, and depth that is safe for use in canine aquatics competitions and the prevents dogs from touching the bottom as they jump into the water. The container may comprise an in-ground or above-ground swimming pool. In one embodiment, the container is generally rectangular. In one embodiment, the container is at least 40 feet long. In another embodiment, the water is at least 4 feet deep. In one embodiment, the platform may over-hang the container by up to about 2 feet. A partition may divide the container into two or more lanes. The partition may be of any size or material. In one embodiment, the partition may be at least partially transparent or substantially translucent. Optionally, the partition may be made of the same material as the partition that divides the platform.

The aquatic race assembly may include separate lanes for any number of dogs. In one embodiment, the assembly includes lanes for two dogs. In another embodiment, the assembly includes from two to five lanes.

The assembly includes a lure or object to be bitten by a dog. The object is positioned proximate to the water. In one embodiment, the object is positioned approximately 38 feet from the end of the platform and approximately 58 feet from the start line. The object is releasably held a predetermined height above the surface of the water. In one embodiment, the object is positioned approximately 2 inches above the surface of the water. Each lane includes an object.

Optionally, the assembly may include a system controller. The system controller may comprise any type of computer, including a laptop computer, a tablet computer, and a smart phone. The system controller signals a cueing or starting indicator adapted to provide one or more of an audio, visual, and physical cue to start a race. For example, in one embodiment, the system controller generates a ready signal, a set signal, and a go signal that are provided by the indicator device. In one embodiment, each lane may include a separate starting indicator. In this manner, the signals provided by the starting indicator may be different for each lane. Accordingly, a first starting indicator for a first lane of the assembly may provide a first signal at a different time than a second starting indicator for a second lane provides a second signal. The start signals provided at different times may be used to handicap two teams that have different average race times. In one embodiment, the first starting indicator provides the first start signal before the second starting indicator provides the second start signal. The time difference between the first start signal and the second start signal may be equal to a race time (or average race time) of a team assigned to the first lane and a race time (or average race time) of a team assigned to the second lane.

When the race starts, the system controller starts a timer associated with each dog participating in the race. A sensor proximate to the starting line records when each dog in the race crosses the starting line. The system controller can determine if a dog crosses the start line prior to the start of race using data received from the sensor. When a dog bites the object in the dog's lane, the system controller stops the timer associated with the dog's lane. Optionally, in one embodiment, the dog must pull the object to disconnect the object from the system controller to stop the timer and end the race. The system controller is operable to determine which dog retrieved the object in the least amount of time. In one embodiment, each lane has two sensors proximate to the starting line. The two sensors are spaced apart vertically.

A video system may optionally be interconnected to the assembly. The video system may comprise any number of cameras and displays. Additionally or alternatively, the video system may be interconnected to, or controlled by, the system controller. In one embodiment, the video system comprises a stationary camera. In another embodiment, a camera is provided for each lane of the assembly. In another embodiment, the video system comprises a non-stationary camera. The non-stationary camera may be adapted to move substantially parallel to a lane of the assembly. In one embodiment, non-stationary cameras are provided for each lane. The non-stationary cameras may be arranged in a variety of positions. In one embodiment, the non-stationary cameras are interconnected to the partitions of the platform and the container. In another embodiment, the non-stationary cameras are positioned proximate to lateral sides of the platform and the container. In another embodiment, non-stationary cameras are positioned above the assembly. For example, the non-stationary cameras may be suspended from cables as will be appreciated by one of skill in the art. In another embodiment, the non-stationary camera is adapted to pivot around a substantially vertical axis. Any variety of cameras may be used with the assembly, including one or more of video cameras and still image cameras. In one embodiment, at least one camera is positioned within the water and arranged to capture the dogs as the dogs jump into the water and swim to the object.

Displays may show images of a race captured by the cameras. In one embodiment, the images are displayed substantially simultaneously as they are captured by the cameras. As will be appreciated, the displays may also show information about the race, such as, but not limited to, an elapsed and final time for each canine during a race, a team name or name of the canine, and standings for each race participant or team.

Another aspect of the present disclosure is to provide a portable aquatic race assembly. In one embodiment, the portable aquatic race assembly is adapted to be disassembled. The individual portions of the assembly may be transported in one or more vehicles. In one embodiment, the platform is positioned on a vehicle used to transport the assembly. The vehicle may comprise a trailer pulled by another vehicle, a flat-bed truck, or a vehicle with an enclosed space, such as a van or commercial trailer adapted to be pulled by a tractor.

Yet another aspect of the present disclosure is a portable aquatic race assembly adapted for use within a closed structure or outside.

Yet another aspect of the present invention is to provide a method of normalizing times for dogs recorded in a race using the aquatic race assembly. In one embodiment, the system controller is operable to normalize race times for different dogs based on one or more of the following: a late start, a rule violation, a ranking/handicap of the dog, a handicap of the team, and a handicap of the handler. In on embodiment a team may be handicapped with a delayed starting light as per required bracketing. For example, in one embodiment, a start indicator may be associated with each lane. A team in lane one with a slower average race time receives a start signal from a start indicator associated with lane one before a team in lane two with a faster average race time receives a start signal from a start indicator associated with lane two. Optionally, the difference in time between the start signal in lane one and the start signal in lane two may be approximately equal to a different in the average race time of the team in lane one and the average race time of the team in lane two.

One aspect of the present disclosure is a system of measuring the performance of two or more dogs. In one embodiment, a time is recorded for a dog to complete a course. The course comprises a run, a jump, a swim, and retrieval of an object. In one embodiment, the run is approximately 20 feet. In another embodiment, the length of the body of water for the jump and swim is approximately 38 feet. In still another embodiment, the object is positioned approximately 2 inches above the surface of the water in which the dog swims. The time for each dog from when the dog crosses the starting line until the dog grasps and pulls the object (the "retrieval time") is compared to times recorded for other dogs completing similar courses. Each dog is also measured on a "reaction time" comprising a measure of the amount of time between when a race starts and the time the dog actually crosses the start line. Optionally, two or more dogs may be timed substantially simultaneously while completing the course in separate lanes.

One aspect of the present disclosure is to provide a novel aquatic race assembly. The assembly generally includes, but is not limited to: (1) a platform having an end; (2) a start position on the platform; (3) a container adapted to be filled with water and located proximate to the end of the platform; (4) a partition adapted to define two lanes that extend a predetermined distance from the start position; and (5) a first object positionable a predetermined distance from the start position in a first lane and a second object positionable the predetermined distance from the start position in a second lane. The objects are adapted to be bitten by a dog.

Optionally, the assembly may further comprise a sensor adapted to detect an event and send a signal to a control system. In one embodiment, the sensor is positionable proximate to the start position. In another embodiment, the sensor is operable to detect when a dog crosses a predetermined point of the assembly and, in response, send the signal. The predetermined point may be a start line. In another embodiment, the sensor is operable to determine the absence of a dog from a predetermined portion of the assembly and, in response, send the signal. The predetermined portion may be the start position. Accordingly, the sensor can sense when a dog is no-longer within the start position. In one embodiment, the sensor is a pressure plate. In another embodiment, the sensor is operable to determine when the dog crosses a boundary of the start position. Said another way, the sensor is operable to determine when any portion, or a predetermined portion, of the dog's body contacts a plane substantially perpendicular to the upper surface of the platform and generally parallel to the boundary of the start position. In this manner, when any portion, or the predetermined portion, of the dog's body crosses the boundary, the sensor will send the signal.

Additionally or alternatively, the assembly may further comprise a control system. The control system is operable to measure a travel time for a dog in a lane to travel the predetermined distance to the object in the dog's lane. Optionally, the first and second objects are releasably interconnectable to the control system. In this manner, in one embodiment, the control system is operable to measure the travel time upon receipt of the signal from the sensor until the dog releases the object in its lane from the control system. Said another way, the travel time comprises an amount of time from receipt of the signal from the sensor until the dog release the object in its lane.

In one embodiment, the assembly further comprises a starting indictor operable to provide a start signal to begin a race. In another embodiment, the control system is further operable to measure a reaction time from when the start signal is provided by the starting indicator until receipt of the signal from the sensor. A first starting indicator may be associated with the first lane and a second starting indicator may be associated with the second lane. Optionally, the control system may provide start signal from each of the first starting indicator and the second starting indicator at different times.

In one embodiment, the start position is approximately 20 feet from the platform end. In another embodiment, the container is adapted to be filled with water so that a top surface of the water is about 2 feet below a top surface of the platform. In still another embodiment, the first and second objects for the first and second lanes are positionable approximately 38 feet from the platform end. In yet another embodiment, the first and second objects for the first and second lanes are positionable to be approximately 2 inches above the top surface of the water. In one embodiment, a start line is approximately 20 feet from the platform end. In another embodiment, the platform is between about 4 feet and about 12 feet wide and, more preferably, between about 6 feet and about 9 feet wide. In another embodiment, the platform is at least about 28 feet long. In still another embodiment, the container is about the same width as the platform and is at least 3 feet deep. In another embodiment, the assembly is modular and transportable.

Additionally or alternatively, the partition may optionally comprise a first partition for the platform and a second partition for the container. In one embodiment, the partition is substantially transparent. In another embodiment, the partition is planar and comprises one of a flexible material and a substantially rigid material.

It is another aspect of the present disclosure to provide a method of conducting a canine race using an aquatic race assembly. The method includes, but is not limited to: (1) configuring the aquatic race assembly; and (2) conducting a race with the assembly. In one embodiment, the assembly includes, but is not limited to: a platform with a start position a predetermined distance from an end of the platform; a container of water positioned proximate to the platform end; a partition defining a first lane and a second lane in the aquatic race assembly; and a first object in the first lane and a second object in the second lane, the first and second objects positioned proximate to the water a predetermined distance from the start position. The objects are adapted to be grasped by a dog. The race generally comprises two dogs leaving the start position, moving from the platform into the water, and moving in the water towards the object in the dog's lane. Optionally, the start position may be marked or bounded by a start line. In one embodiment, the start position is approximately 20 feet from the platform end, and the objects are approximately 38 feet from the platform end.

Additionally or alternatively, the method may further comprise determining which of the two dogs is fastest by measuring the travel time for each dog, the travel time comprising an amount of time for a dog to travel the predetermined distance and engage the object in its lane. The travel time may begin by determining when a dog in a lane, or a predetermined portion of a dog, crosses a predetermined portion of the platform. For example, the travel time may begin when the dog crosses a boundary of the start position. A sensor may be positioned to detect when the dog crosses the predetermined portion of the platform. In another embodiment, the travel time may begin when the dog moves out of the start position. A sensor may be positioned to detect when the dog crosses the predetermined portion of the platform or moves out of the start position. For example, in one embodiment a weight sensor or a pressure sensor may be associated with the start position. In another embodiment, a sensor may be positioned to detect when the dog is within the start position and when the dog is not within the start position.

In one embodiment, determining the fastest dog further comprises measuring a reaction time for each dog. The reaction time comprises an amount of time that has elapsed from when a start signal is provided until the dog leaves the start position. In one embodiment, if two dogs have identical travel times, the fastest dog is the dog with the lowest reaction time.

Additionally or alternatively, configuring the aquatic race assembly may further comprise interconnecting a control system to the first and second objects. In one embodiment, the control system is in communication with a starting indicator that provides the start signal and with the first and second obj ect. Optionally, the control system may measure the travel time and the reaction time for each of the two dogs. In another embodiment, the control system is in communication with a sensor that can determine when each dog leaves the start position or when a dog is no-longer in the start position.

In one embodiment, the method further comprises provide a start signal by the starting indicator. Optionally, a first starting indicator may be associated with the first lane and a second starting indicator may be associated with the second lane. Optionally, the control system may provide start signal from each of the first starting indicator and the second starting indicator at different times. Accordingly, the method may further comprise determining a difference between an average race time for a dog in the first lane and for a dog in the second lane. The control system may then provide a start signal with the start indicator associated with the lane of the dog with a slower average race time before providing a start signal with the start indicator associated with the lane of the dog with the faster average race time. In one embodiment, the start signal associated with the faster dog may be delayed by an amount of time approximately equal to the different in the average race times of the dogs.

It is another aspect of the present invention to provide a non-transitory computer readable medium having stored thereon instructions that cause a processor of a control system to conduct a dog race using an aquatic race assembly. The aquatic race assembly generally includes two lanes and a platform with an end positioned proximate to a body of water and a lure in each lane. The instructions include, but are not limited to: (1) an instruction to provide a start signal; (2) an instruction to receive a first signal from a sensor when the sensor detects a predetermined event; (3) an instruction to determine a reaction time for a dog in a lane, the reaction time comprising an amount of time that has elapsed from when the start signal is provided until the first signal is received; (4) an instruction to receive a second signal when the dog disconnects the lure in the lane from the control system, the lure positionable a predetermined distance above a surface of the water; (5) an instruction to determine a retrieve time for the dog, the retrieve time comprising an amount of time that has elapsed between receipt of the first signal and receipt of the second signal; and (6) an instruction to determine which dog in the dog race is the fastest based on at least one of the retrieve time and the reaction time of each dog.

In one embodiment, the sensor is a pressure sensor. The pressure sensor is operable to determine when the dog is in the start position and when the dog is not in the start position. Accordingly, the pressure sensor provides the first signal when the dog is not in the start position. Additionally or alternatively, the sensor may further comprise a sensor positioned at an edge of the start position proximate the end of the platform. The sensor is operable to determine when a predetermined portion of the dog crosses the edge. For example, when the sensor determines that any portion of the dog's body, such as (but not limited to) a paw or a nose, has crossed the edge, the sensor provides the first signal.

In one embodiment, providing the start signal comprises sending a signal to a start indicator to generate a visual cue, such as a light, or an audible noise that is provided by the start indicator. Additionally or alternatively, a first start indicator may be associated with a first of the two lanes and a second start indicator may be associated with a second of the two lanes. Optionally, the instructions may further comprise providing an instruction to the first start indicator to provide a start signal at a first time and providing an instruction to the second start indicator to provide a start signal at a different second time. The instructions may further comprise determining which dog in each of the two lanes has a slower average race time and determining a difference in the average race time between the two dogs in the two lanes. The instructions may optionally include providing a start signal for a slower dog before providing a start signal for a faster dog. Optionally, the start signal for the faster dog may be delayed by an amount of time approximately equal to the difference in the average race time between the two dogs.

In one embodiment, start position is approximately 20 feet from the platform end. In another embodiment, the lure is approximately 38 feet from the platform end. Accordingly, the dog must move from the platform into the water and swim through the water to disconnect the lure from the control system.

The Summary is neither intended nor should it be construed as being representative of the full extent and scope of the present disclosure. As will be appreciated, other embodiments of the disclosure are possible using, alone or in combination, one or more of the features set forth above or described in detail below. Moreover, references made herein to "the present invention," "the present disclosure," or aspects thereof should be understood to mean certain embodiments of the present disclosure and should not necessarily be construed as limiting all embodiments to a particular description. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detail Description, particularly when taken together with the drawings.

These and other advantages will be apparent from the disclosure contained herein. The above-described embodiments, objectives, and configurations are neither complete nor exhaustive. As will be appreciated, other embodiments of the disclosure are possible using, alone or in combination, one or more of the features set forth above or described below. Further, the Summary is neither intended nor should it be construed as representing the full extent and scope of the present disclosure. The present disclosure is set forth in various levels of detail in the Summary, and, in the attached drawings and the Detailed Description. No limitation as to the scope of the present disclosure is intended to either the inclusion or non-inclusion of elements, components, etc. in this Summary. Additional aspects of the present disclosure will become more readily apparent from the detailed description, particularly when taken with the drawings.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

The terms "communication device," "smart phone," and "mobile device," and variations thereof, as used herein, can be used interchangeably and may include any type of device capable of communicating with one or more of another device and/or across a communications network, via a communications protocol, and the like. Exemplary communication devices may include but are not limited to smart phones, handheld computers, laptops, netbooks, notebook computers, subnotebooks, tablet computers, scanners, portable gaming devices, phones, pagers, GPS modules, portable music players, and other Internet-enabled and/or network-connected devices.

The term "bus" and variations thereof, as used herein, can refer to a subsystem that transfers information and/or data between various components. A bus generally refers to the collection of communication hardware interfaces, interconnects, bus architecture, standard, and/or protocol defining the communication scheme for a communication system and/or communication network. A bus may also refer to a part of a communication hardware that interfaces the communication hardware with the interconnects that connect to other components of the corresponding communication network. The bus may be for a wired network, such as a physical bus, or wireless network, such as part of an antenna or hardware that couples the communication hardware with the antenna. A bus architecture supports a defined format in which information and/or data is arranged when sent and received through a communication network. A protocol may define the format and rules of communication of a bus architecture.

The term "communication system" or "communication network" and variations thereof, as used herein, can refer to a collection of communication components capable of one or more of transmission, relay, interconnect, control, or otherwise manipulate information or data from at least one transmitter to at least one receiver. As such, the communication may include a range of systems supporting point-to-point or broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e., an antenna) and running software capable of using the communication means to send and/or receive a signal within the communication system. Interconnect refers some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium," as used herein refers to any tangible storage and/or transmission medium that participates in providing instructions to a processor for execution. Such a medium may take many forms, including but not limited to, non-volatile media, volatile media, and transmission media. Non-volatile media includes, for example, non-volatile random access memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a compact disc read only memory (CD-ROM), any other optical medium, punch cards, paper tape, any other physical medium with patterns of holes, a random access memory (RAM), a programmable read only memory (PROM), and erasable programmable read only memory EPROM, a FLASH-EPROM, a solid state medium like a memory card, any other memory chip or cartridge, a carrier wave as described hereinafter, or any other medium from which a computer can read. A digital file attachment to an e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. It should be noted that any computer readable medium that is not a signal transmission may be considered non-transitory.

The term "module" as used herein refers to any known or later developed hardware, software, firmware, artificial intelligence, fuzzy logic, or combination of hardware and software that is capable of performing the functionality associated with that element.

The terms "determine," "calculate," and "compute," and variations thereof, as used herein, are used interchangeably and include any type of methodology, process, mathematical operation, or technique.

The term "automatic" and variations thereof, as used herein, refer to any process or operation done without material human input when the process or operation is performed. However, a process or operation can be automatic, even though performance of the process or operation uses material or immaterial human input, if the input is received before the performance of the process or operation. Human input is deemed to be material if such input influences how the process or operation will be performed. Human input that consents to the performance of the process or operation is not deemed to be "material."

The term "in communication with," as used herein, refers to any coupling, connection, or interaction using electrical signals to exchange information or data, using any system, hardware, software, protocol, or format, regardless of whether the exchange occurs wirelessly or over a wired connection.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

Although various dimensions are provided to illustrate exemplary embodiments of the present disclosure and the components thereof, it is expressly contemplated that dimensions may be modified in apparatus of the present disclosure and still comport with the scope and spirit of the disclosure. Thus, unless otherwise indicated, all numbers expressing quantities, dimensions, conditions, and so forth used in the specification and claims are to be understood as being modified in all instances by the term "about."

BRIEF DESCRIPTION OF THE DRAWINGS

The accompanying drawings, which are incorporated in and constitute a part of the specification, illustrate embodiments of the disclosure and together with the general description of the disclosure given above and the detailed description given below, serve to explain the principles of this disclosure.

Figure 1:
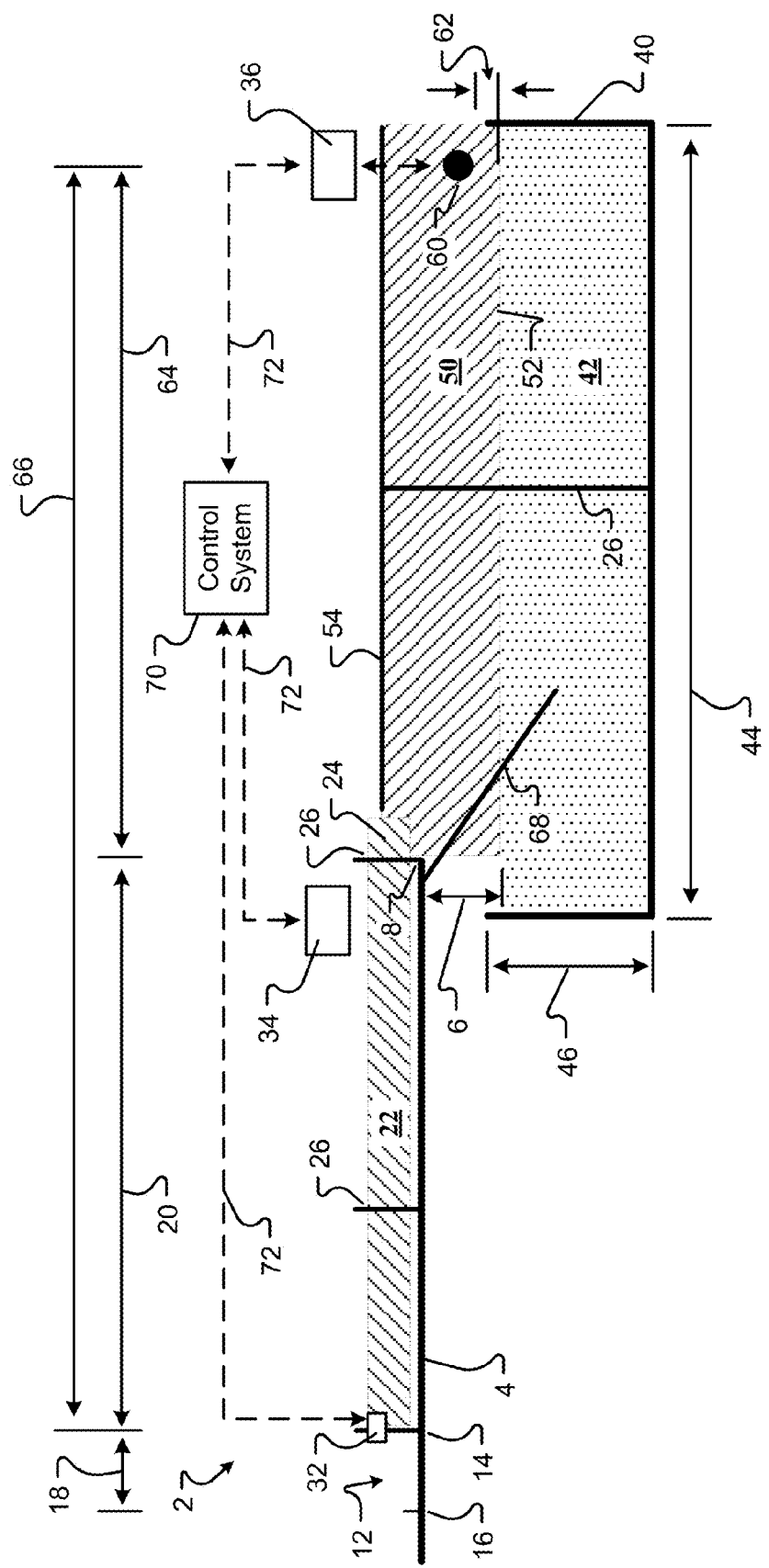
FIG. 1 is a front elevation view of an aquatic race assembly of an embodiment of the present disclosure.

It should be understood that the drawings, photographs, and diagrams are not necessarily to scale. In certain instances, details which are not necessary for an understanding of the disclosure or which render other details difficult to perceive may have been omitted. It should be understood, of course, that the disclosure is not necessarily limited to the particular embodiments illustrated herein.

Similar components and/or features may have the same reference number. Components of the same type may be distinguished by a letter following the reference number. If only the reference number is used, the description is applicable to any one of the similar components having the same reference number.

To assist in the understanding of one embodiment of the present invention the following list of components and associated numbering found in the drawings is provided herein:

| Number | Component |
|---|---|
| 2 | Aquatic race assembly |
| 4 | Platform |
| 6 | Height of platform above water surface |
| 8 | Platform end |
| 12 | Starting area |
| 14 | Starting line |
| 16 | Second side of starting area |
| 18 | Width of starting area |
| 20 | Distance of starting line from platform end |
| 22 | Platform partition |
| 24 | Partition portion over water |
| 26 | Post |
| 28 | First lane |
| 30 | Second lane |
| 32 | Start sensor |

-continued

| Number | Component |
|---|---|
| 34 | Starting indicator |
| 36 | Lane status indicator |
| 38 | Stairs |
| 40 | Container |
| 42 | Water |
| 44 | Container length |
| 46 | Container height |
| 50 | Container partition |
| 52 | Partition bottom |
| 54 | Partition bumper |
| 58 | Wire |
| 60 | Object |
| 62 | Height of object above water surface |
| 64 | Distance from platform to object |
| 66 | Distance from start line to object |
| 68 | Ramp |
| 70 | Control system |
| 72 | Cable |
| 74 | Processor |
| 76 | Display |
| 78 | Speaker |
| 80 | Memory |
| 82 | Network interface |
| 84 | Start sensor interfaces |
| 86 | Start cue interfaces |
| 88 | Object interfaces |
| 90 | Power supply |
| 92 | Assembly for position object |
| 94 | Arm |
| 104 | Data-processing system |
| 108 | Bus |
| 110 | CPU |
| 112 | Input device |
| 114 | Output device |
| 116 | Storage device |
| 118 | CRM reader |
| 120 | Communications system |
| 122 | Working memory |
| 124 | Acceleration unit |
| 126 | Network |
| 128 | Operating System |
| 130 | Other code |
| 200 | Method of configuring assembly |
| 204 | Start |
| 208 | Configure platform |
| 212 | Configure container |
| 216 | Interconnect control system to assembly |
| 220 | End |
| 300 | Method of conducting a race |
| 304 | Start |
| 308 | Configure assembly |
| 312 | Register teams |
| 316 | Conduct qualifying round |
| 320 | Conduct final rounds |
| 324 | End |

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 2:
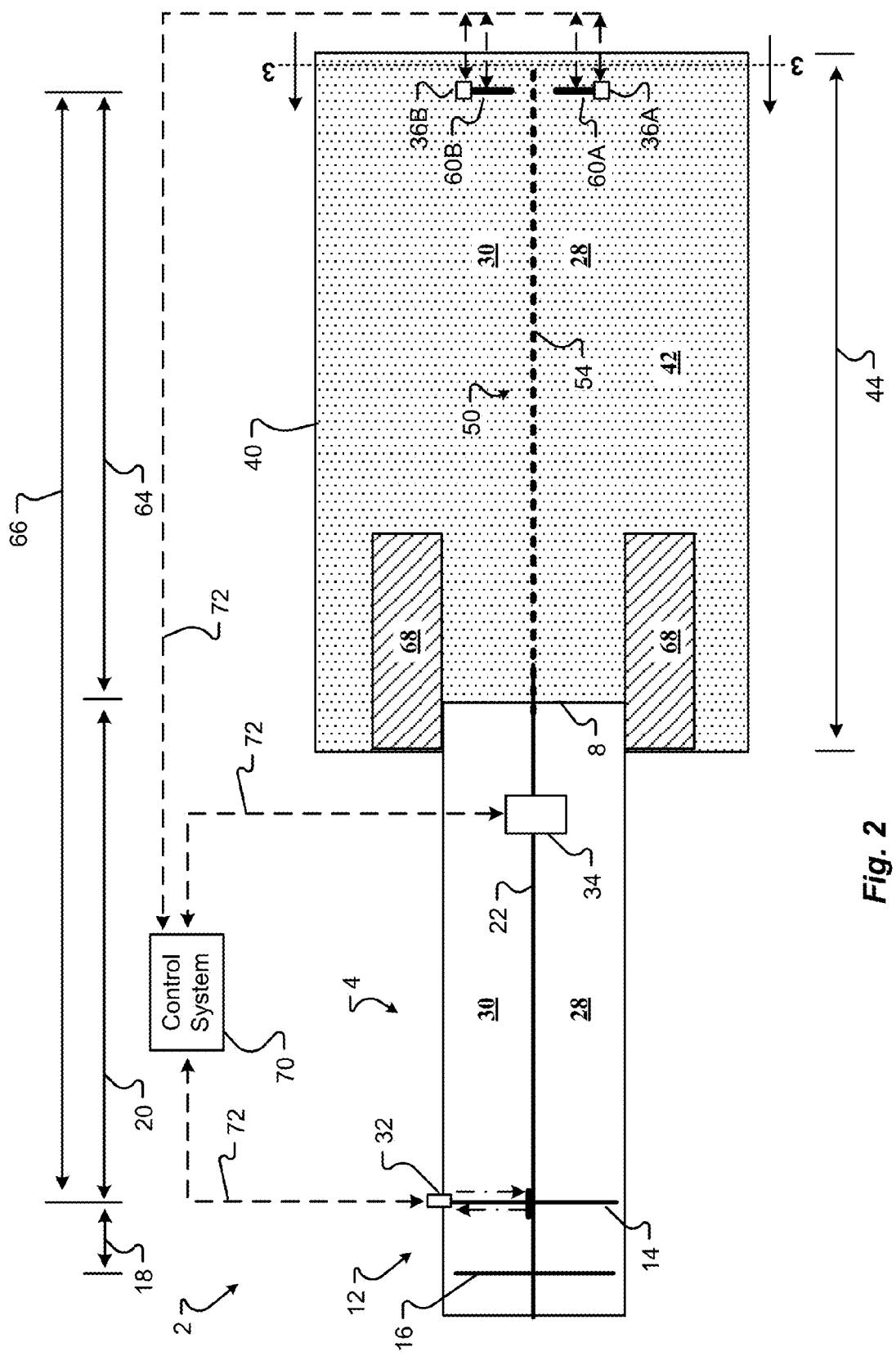
FIG. 2 is a top plan view of the aquatic race assembly of FIG. 1.
Figure 3:
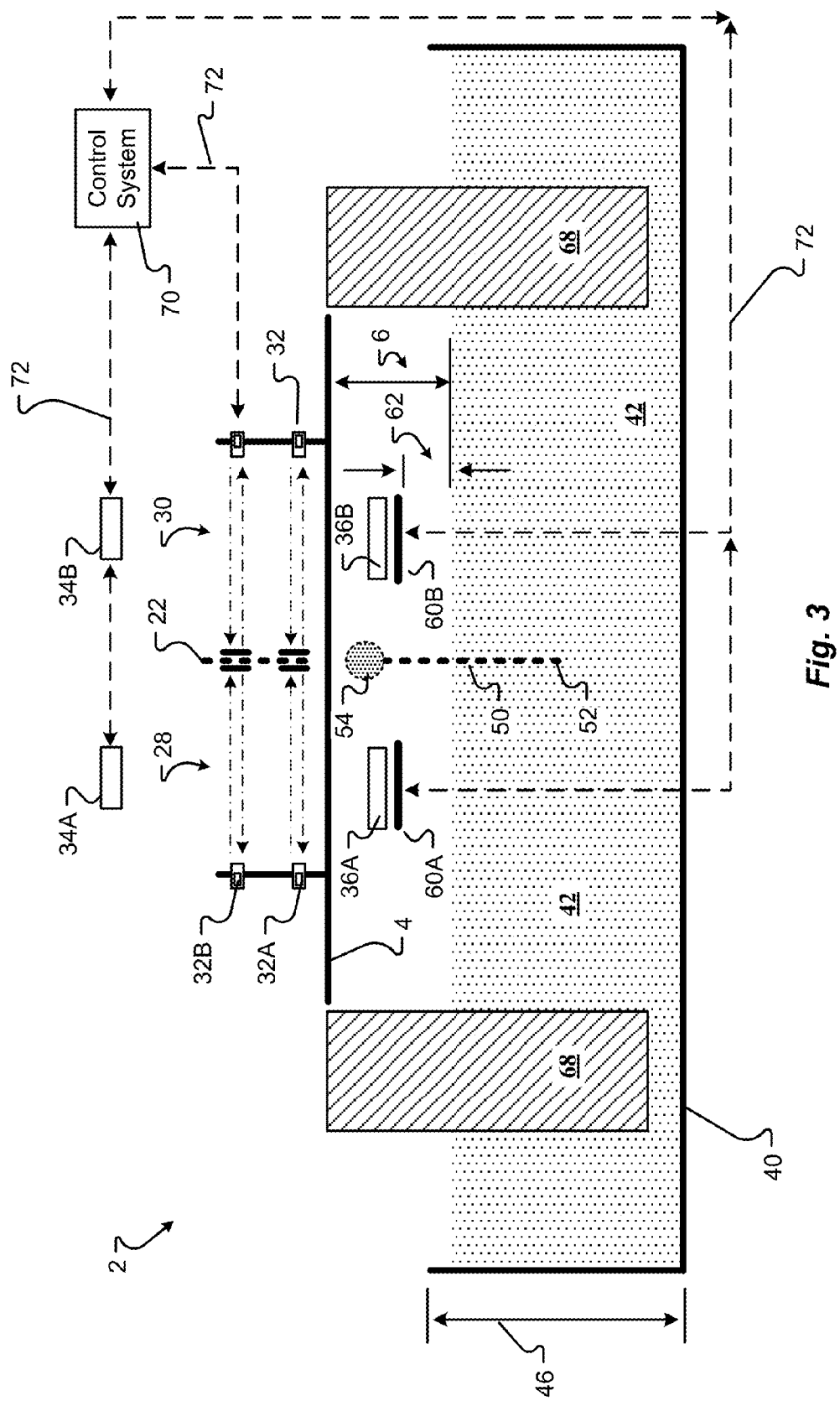
FIG. 3 is a ride side cross-sectional elevation view of the aquatic race assembly of FIG. 1 taken along line 3-3 of FIG. 2.

Referring now to FIGS. 1-3, an embodiment of an aquatic race assembly 2 of one embodiment of the present disclosure is illustrated. The assembly generally includes a dock or platform 4 positioned proximate to a body of water 42. In one embodiment, the water 42 is held in a container 40.

The platform 4 has a predetermined length and width. In one embodiment, the platform is at least 22 feet long. In another embodiment, the platform is at least 28 feet long. In one embodiment, the platform is at least 6 feet wide. In another embodiment, the platform is from about 7 feet to about 9 feet wide. In another embodiment, the platform is less than about 8.6 feet wide.

The platform is positioned at a predetermined height 6 above the surface of the water 42. In one embodiment, the height 6 is from approximately 6 inches to approximately 36 inches above the surface of the water 42. In a more preferred embodiment, the height 6 is approximately 2 feet above the surface of the water. The platform may be mounted upon a variety of structures. In one embodiment, illustrated in FIG. 6, the platform is mounted upon a vehicle. The vehicle may be a trailer or a self-propelled vehicle such as a flat-bed truck. In another embodiment, the platform may be mounted upon staging. In still another embodiment, the platform may be mounted on a structure comprising scaffolding or mobile staging of any type. In still another embodiment, the platform may be mounted upon a structure positioned in the water. For example, the platform may be placed on a barge, a floating dock, or a stationary dock. In yet another embodiment, the platform is a fixed structure comprising wood and/or metal, and other suitable materials. The upper surface of the platform is positioned a predetermined distance above the ground. In one embodiment, the upper surface is positioned from about 1 foot to about 12 feet above the ground.

A starting area 12 is formed in a predetermined portion of the platform. In one embodiment, the starting area 12 has a width 18 of approximately 2 feet. However, other dimensions of the starting area are contemplated. Accordingly, the starting area width may be from about 1 foot to about 4 feet. A starting line 14 of the starting area is positioned a predetermined distance 20 from an end 8 of the platform proximate to the water 42. In one embodiment, the distance 20 is approximately 20 feet. Although the starting lane 14 may be any distance from the platform end, the distance 20 is preferably kept substantially uniform from race to race to ensure dogs participating in races are judged consistently. A second side 16 of the starting area 12 is positioned approximately 2 feet from the starting line 14 and approximately 22 feet from the platform end 8. Optionally, in one embodiment, a weight sensor is positioned within the starting area. The weight sensor is operable to determine changes in the weight of people and dogs in the starting area. In this manner, the weight sensor can provide a signal to the control system 70 when a dog moves from the starting area.

In one embodiment, the platform includes a first lane 28 and a second lane 30. The lanes may be indicated by a line on an upper surface of the platform. Optionally, the upper surface of the platform may be a first color in the first lane and a different second color in the second lane. Optionally, a partition 22 may be positioned between the two lanes 28, 30. The partition may be of any size or material. In one embodiment, the platform partition 22 is at least partially transparent or substantially translucent. Additionally or alternatively, the partition may be generally flexible or substantially rigid. In one embodiment, the partition is a plastic sheet. In another embodiment, the partition is a generally planar material such as plastic, glass, or plexiglas. Optionally, the partition may be formed of, or include, rope, mesh, webbing, or netting. In one embodiment, the partition is adapted to prevent a dog from contacting a dog or person in another lane. In another embodiment, the partition prevents a dog from crossing from one lane into another lane. In still another embodiment, the partition indicates a dividing line between the first and second lane but the partition does not prevent a dog from crossing from one lane into another lane.

The partition may have any desired size. In one embodiment, the partition has a height sufficient to prevent a dog from jumping from one lane into another lane. In another embodiment, the partition has a length of at least 22 feet and a height of at least 2 feet. Optionally, at least a portion 24 of the partition may project beyond the platform end 8 over the water 42. In embodiment, the partition projects approximately 2 feet beyond the platform end 8. In one embodiment, the partition 22 extends from about the starting line 14 and extends at least partially past the platform end 8 over the water 42. Optionally, the partition 22 may extend from the second side 16 of the staring past the platform end 8. In one embodiment, the partition has a height of approximately 5 feet. In another embodiment, the partition is between about 2 feet and about 5 feet in height.

Figure 8:
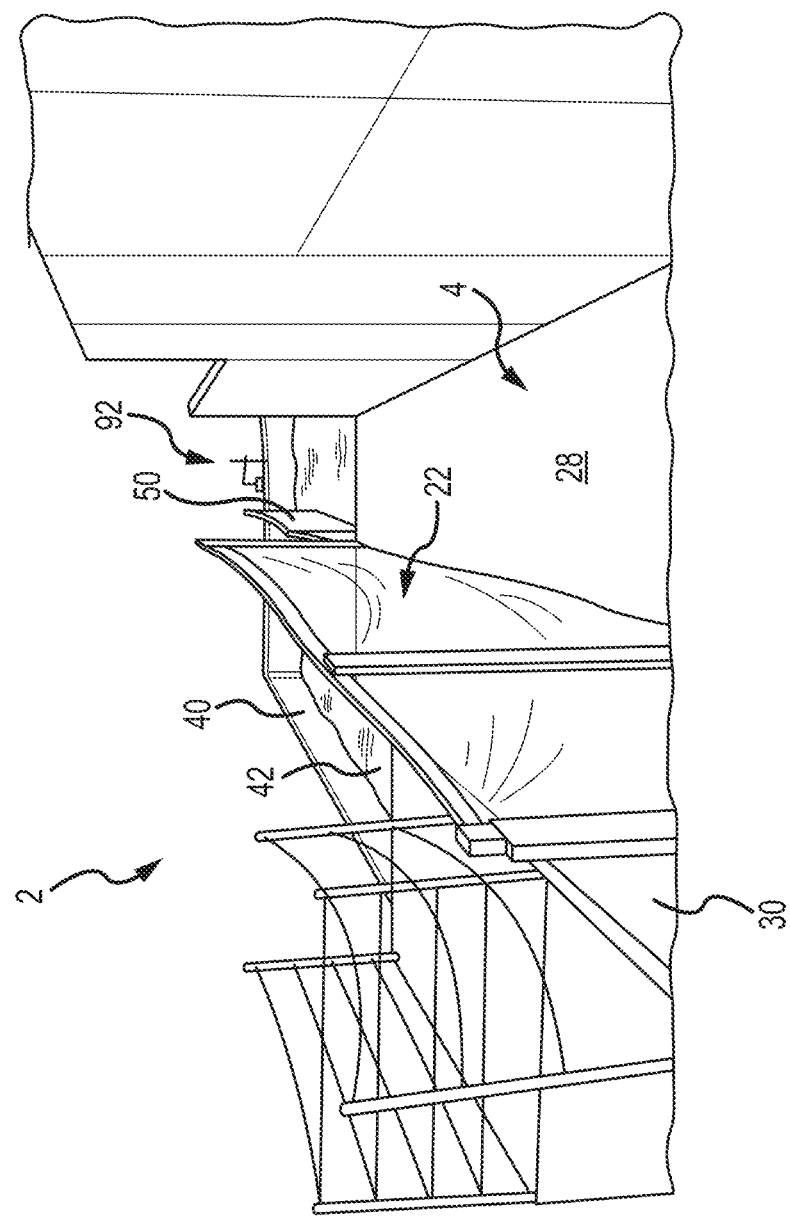
FIG. 8 is a partial top left perspective view of still another aquatic race assembly of the present disclosure showing a partition forming two lanes on a platform of the assembly.
Figure 9:
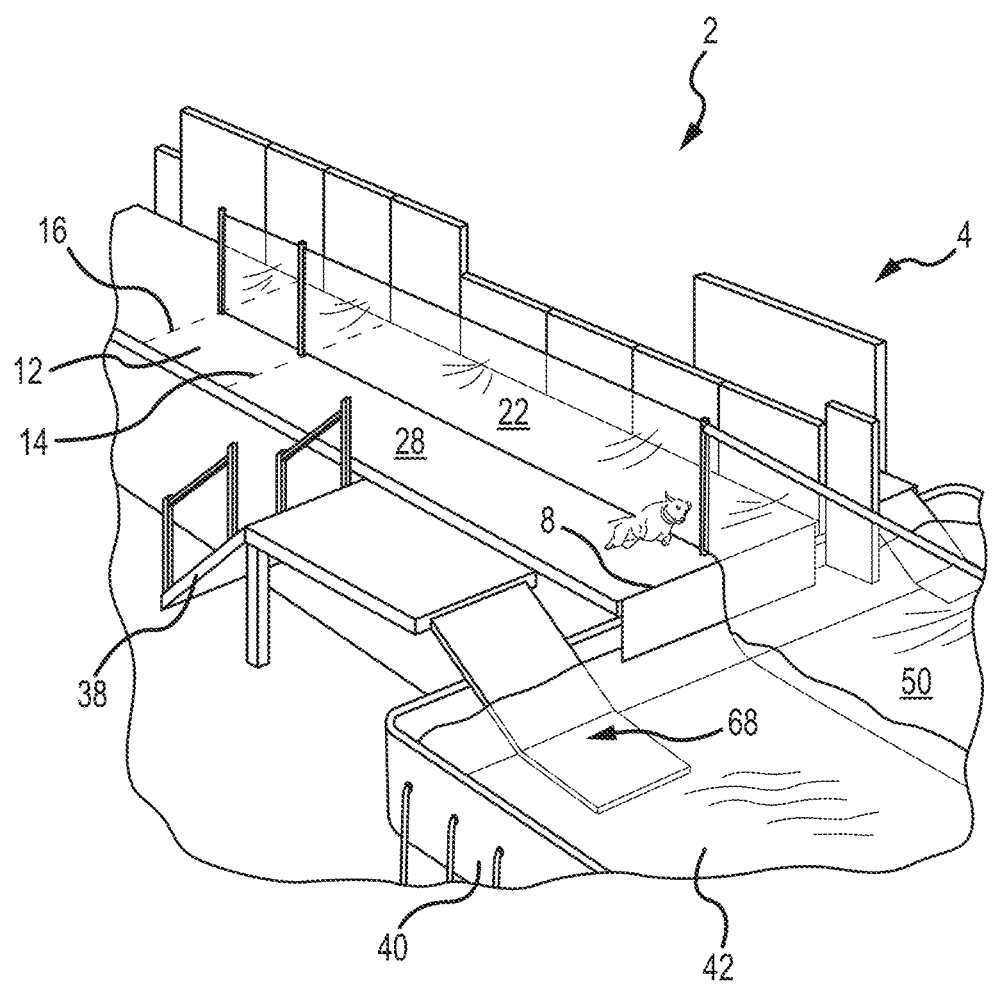
FIG. 9 is a partial top front perspective view of yet another aquatic race assembly with a race in progress and illustrating a ramp positioned partially within the container of water.

The partition may be assembled in a variety of ways. For example, in one embodiment, the partition is interconnected to a cable. The cable may optionally be interconnected to a support member, such as a generally vertical post 26. A tensioning device, such as a turn-buckle may be interconnected to one or more ends of the cable to adjust the tension in the cable. In one embodiment, the support member comprises at least two posts 26 interconnected to the platform. Optionally, the two posts may be substantially parallel. In another embodiment, the two support elements are not parallel. Accordingly, a first support member proximate to the platform end 8 is angled toward the water. A second support member positioned distal to the platform end 8 is angled away from the water. In a more preferred embodiment, the support member comprises three support members. Exemplary embodiments of components of a partition 22 are illustrated in FIGS. 8-9.

A rope rail or opaque barrier may optionally be positioned proximate to one or more of the longitudinal edges of the platform as well as the narrow end of the platform distal to platform end 8. Additionally, the top surface of the platform 4 may be covered with a material selected to prevent slipping when the platform gets wet. For example, in one embodiment, the top surface is covered in a rubber or artificial turf, although other materials are contemplated.

A sensor 32 is positioned substantially aligned with the starting line 14. The sensor is operable to determine when an animal, such as a dog, passes the starting line 14. Any type of sensor 32 may be used with the assembly 2 of the present disclosure. In one embodiment, the sensor 32 comprises a laser. In another embodiment, the sensor may comprise an infra-red system or an optical sensor, such as a camera. Optionally, in still another embodiment, the sensor comprises a trip-line or a gate. The trip-line or gate may be adapted to move in response to contact from a dog.

The sensors 32 are in communication with a control system 70, described in more detail hereinafter. In one embodiment, a cable 72 interconnects the sensor 32 to the control system. However, one of skill in the art will appreciate that any other suitable means may be used to interconnect the sensor and the control system. For example, in another embodiment, the sensor 32 and the control system 70 are wirelessly interconnected, such as by a WiFi, RFID, or Bluetooth™ signal. Optionally, in another embodiment, the control system 70 is remotely located and interconnected to the sensor 32 by a network connection, such as the internet or a commercial wireless connection.

Although only one sensor 32 associated with lane 30 is illustrated in FIG. 2, it will be understood that each lane 28, 30 may include a sensor as illustrated in FIG. 3. In one embodiment, the sensor comprises two sensors 32A, 32B for each lane. The sensors 32A, 32B are vertically spaced. In one embodiment, the first sensor 32A is positioned approximately 6 to 10 inches below the second sensor 32B. In another embodiment, the first sensor 32A is positioned approximately 4 inches above an upper surface of the platform 4 and the second sensor 32B is positioned approximately 12 inches above the platform 4 upper surface. However, other arrangements of the sensors 32 are contemplated.

A starting indicator 34 may optionally be provided. The starting indicator 34 may be positioned at any location on the assembly 2. In one embodiment, the starting indicator 34 is positioned proximate to the platform 4. Alternatively, the starting indicator 34 may be positioned at a distal end of each lane 28, 30 from the starting area 12 proximate to an object 60 to be bitten by the dogs.

The starting indicator 34 is in communication with the control system 70 in a manner the same as, or similar to, the sensor 32. The starting indicator 34 is operable to provide a cue to a dog to start a race. The cue may comprise at least one of an audible, a visible, and a physical cue. In one embodiment, the starting indicator 34 comprises one or more lights. In another embodiment, the indicator 34 is operable to provide a red light, a yellow light, and a green light. The green light indicates the race has started. The red and yellow lights indicate the race is about to start with the red light shown first, the yellow light second, and the greed light third. In another embodiment, the starting indicator 34 comprises a gate proximate to the starting line. The gate can open automatically in response to a signal received from the control system 70 at the start of the race. Although only one starting indicator 34 is illustrated in FIGS. 1-2, it will be appreciated that any number of starting indicators may be provided. For example, in one embodiment, illustrated in FIG. 3, a first starting indicator 34A is associated with the first lane 28 and a second starting indicator 34B is associated with the second lane 30. The first and second starting indicators 34A, 34B may be separately controllable by the control system. In this manner, the first and second starting indicators may provide start signals at the same or different times. Thus, the first starting indicator may provide a start signal before or after the second starting indicator provides a start signal.

The container 40 for the water may be portable or non-portable and of any shape, size, and depth. In one embodiment, the container 40 comprises an in-ground swimming pool. In another embodiment, the container comprises an above-ground swimming pool. In yet another embodiment, the container 40 is portable. In one embodiment, the container is generally rectangular. In still another embodiment, the container 40 is comprises of a flexible material such as, but not limited to, plastic or rubber. In another embodiment, the container is at least partially inflatable. In yet another embodiment, the container 40 comprises a lake or pond.

In one embodiment, the container has a length 44 of least 38 feet. In another embodiment, the container 40 has a height 46 of at least 3 feet. In one embodiment, the container has a width at least equal to the width of the platform.

A partition 50 may divide container into two or more lanes. The container partition may be of any size or material. In one embodiment, the partition 50 may be at least partially transparent or substantially translucent. In another embodiment, the partition comprises a plastic sheet. Additionally or alternatively, the partition 50 may be made of the same or similar material as the platform partition 22. In yet another embodiment, the partition is comprised of a substantially inflexible material. Optionally, the container partition may be interconnected to a portion of the platform partition 22.

Similar to the platform partition 22, the water partition 50 may indicate a dividing line between the two lanes 28, 30 without forming a barrier sufficient to prevent a dog from moving from one of the lanes to the other lane. Accordingly, the partition 50 may comprise a rope or cable positioned proximate to the surface of the water. In one embodiment, the partition 50 comprises a rope suspended by at least one float. Optionally, at least one post 26 may be positioned within the container 40 to arrange the partition in a predetermined position. Additionally or alternatively, the post 26 may prevent inadvertent or unintended movement of the partition. In another embodiment, the partition comprises a series of floats of any type. For example, the partition 50 may be the same as, or similar to, a lane divider for a swimming pool such as used to conduct aquatic races.

Additionally or alternatively, the partition 50 may form a barrier adapted to prevent dogs from moving from one lane to another lane. Thus, the partition 50 may have any desired size to separate the lanes 28, 30 in the water 42 and to prevent a dog from jumping over, or swimming under, the partition or contacting a dog in a different lane. In one embodiment, the container partition has a length of at least 38 feet and a height of at least 3 feet. In another embodiment, the partition extends at least 2 feet above the surface of the water and at least 1 foot below the surface of the water. In yet another embodiment, the partition extends from a bottom of the container 40 to the surface of the water. In still another embodiment, the partition extends about 8 inches above the water surface. In yet another embodiment, the partition extends from the water surface about 2 feet into the water.

Figure 7:
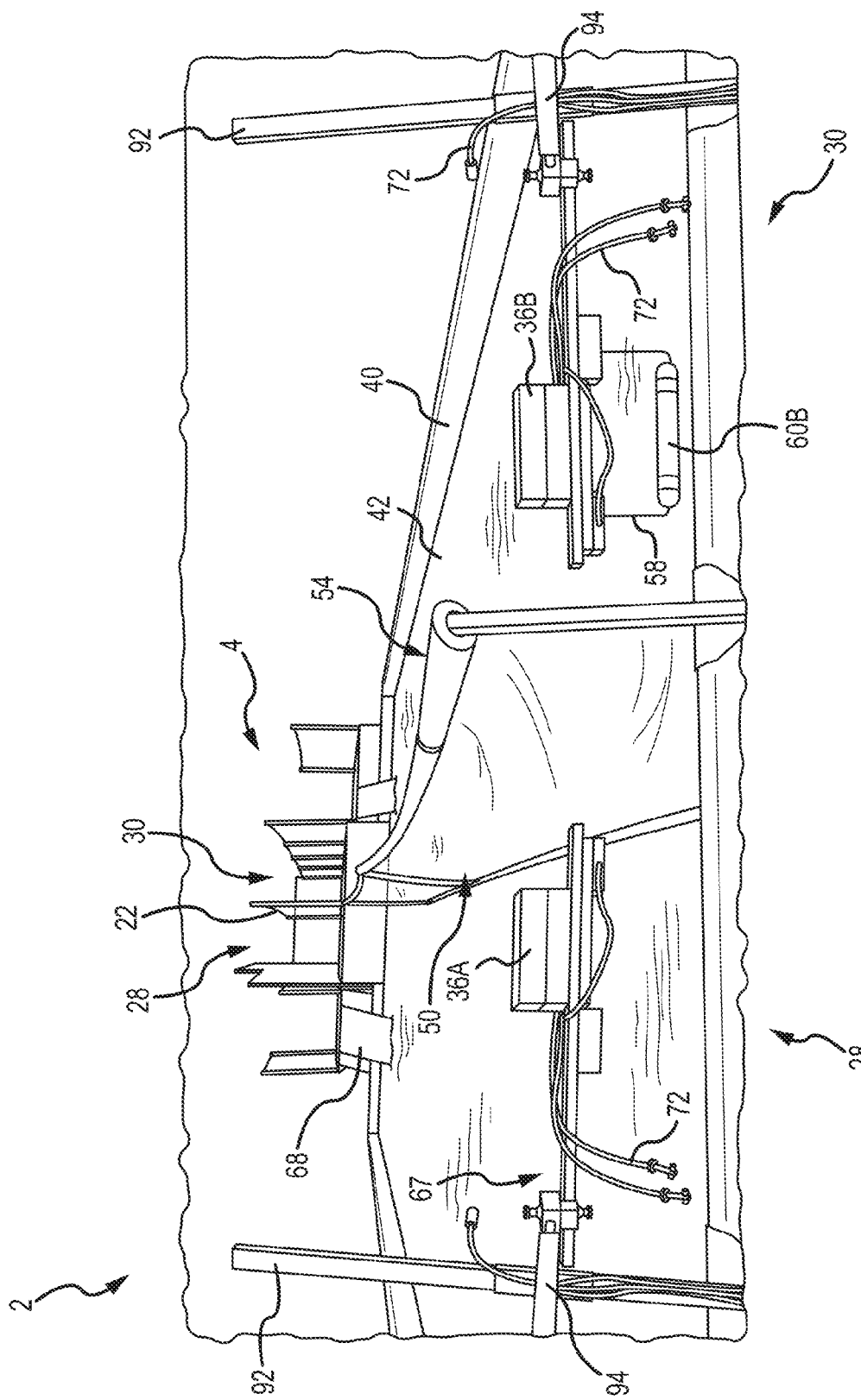
FIG. 7 is a partial ride side elevation view an aquatic race assembly of the present disclosure illustrating the water container as well as a stand that holds an object proximate to the water and a partition positioned in the water.

The partition may be assembled in a variety of ways. For example, in one embodiment, the partition is interconnected to a cable. The cable may optionally be interconnected to a support member, such as a post. A tensioning device, such as a turn-buckle may be interconnected to one or more ends of the cable to adjust the tension in the cable. In one embodiment, the support member comprises at least one support member interconnected to an exterior surface of the container. A second support member may be interconnected to the platform. In one embodiment, the second support includes an eye-bolt. Optionally, at least one support member may be positioned within the container. For example, in one embodiment, the assembly includes a medial support member 26 positioned within the container and adapted to hold the cable a predetermined distance above (or proximate to) the surface of the water. Embodiments of components of a partition 50 are illustrated in FIG. 7.

Optionally, the bottom portion 52 of the partition 50 is biased downward to prevent inadvertent or unintended movement of the partition. In one embodiment, at least one weight is interconnected to the partition to prevent inadvertent or unintended movement of the partition. However, it will be appreciated that other means may be used to secure the partition in a predetermined position. For example, in one embodiment a cable interconnected to a portion of the partition biases the partition in the predetermined position. In one embodiment, the cable is interconnected proximate to a lower portion of the partition adapted to be positioned within the water. In another embodiment, the cable interconnects the lower portion to a bottom of the container. In still another embodiment, the cable interconnects the lower portion to at least one side of the container 40.

Additionally or alternatively, a bumper 54 may optionally be interconnected to an upper portion of the partition 50. The bumper is adapted to prevent injury to dogs jumping from the platform into the water 42. The bumper 54 may be made of any suitable material. In one embodiment, the bumper 54 comprises a foam, rubber, or PVC material. In another embodiment, the bumper is at least partially inflatable. One embodiment of a bumper 54 is illustrated in FIG. 7.

An object 60 or lure to be retrieved by a dog is positioned a predetermined distance 64 from the platform end 8 and a predetermined height 62 above the water surface. In one embodiment, the distance 64 from the platform end to the object is approximately 38 feet. It follows that the distance 66 from the start line 14 to the object 60 is approximately 58 feet. In another embodiment, the height 62 of the object above the water is approximately 2 inches. Although other distances 64, 66 and heights 62 are contemplated, the distances 64, 66 and the height 62 are maintained substantially uniform during each race to ensure dogs participating in races are judged consistently.

One embodiment of an assembly 92 adapted to position the object 60 in a predetermined position is illustrated in FIG. 7. The assembly 92 may optionally have an adjustable height. In one embodiment, the assembly 92 includes at least one substantially vertical member and at least one substantially horizontal member 94. In one embodiment, the assembly may be adapted to position one object 60 for one lane. In another embodiment, the assembly may be adapted to hold objects 60 for more than one lane.

The object 60 is comprised of a durable material that a dog can grasp or snatch with its mouth. In one embodiment, the object has a generally cylindrical shape. The object 60 is selectively interconnected to the control system 70. In one embodiment, an object 60A, 60B is associated with each lane 28, 30 of the assembly. Optionally, the object 60 may include an output device, such as a speaker or a light. In this manner, the object may emit a light and/or a sound to attract the dog. The output device may be activated and controlled by the control system 70. Optionally, the control system may activate the output device prior to starting the race to help the dogs participating in the race to mark or identify the object 60 in its lane. The control system may activate the output device of the object in each lane 28, 30 individually.

It will be appreciated by one of skill in the art that the object 60 may be interconnected to the control system 70 in a variety of different ways. The object 60 may be interconnected to the control system by a closed switch. In one embodiment, the object 60 includes at least two different channels 72 interconnected to the control system. Each channel interconnecting the object to the control system is adapted to be severed when a dog snatches the object 60 and pulls the object with a predetermined amount of force. When the dog pulls the object and severs the connection of the object to the control system, the control system can stop a timer associated with the object. Any means known to one of skill in the art or developed in the future may be used to interconnect the object 60 to the control system 70. In one embodiment, the object 60 is interconnected to the control system 70 by a magnetic switch.

Additionally or alternatively, the object may include a pressure sensor. Accordingly, when a dog snatches the object, the pressure sensor may send a signal to the control system. When the force applied to the object by the dog's jaws measured by the pressure sensor is greater than or equal to a predetermined amount, the control system can stop the timer associated with the object. In one embodiment, the pressure sensor comprises an air switch.

A motion sensor adapted to measure an amount of movement of the object 60 may be associated with the object 60. The motion sensor may be interconnected to the control system. When the dog snatches and moves the object 60 a predetermined distance measured by the motion sensor, the control system can stop the timer associated with the object. In one embodiment, the object 60 includes an integral motion sensor. In another embodiment, the motion sensor is positioned external to the object 60 and adapted to measure motion of the object 60. In one embodiment, the motion sensor comprises at least one of a laser, an RFID system, and an imaging system.

Lane status indicators 36 may optionally be positioned proximate to the objects 60 in each lane. The lane status indicators 36 are interconnected to the control system 70 in any suitable manner similar to the starting indicator 34 and the start sensor 32. In one embodiment, the indicators 36 are the same as, or similar to, the starting indicators 34. Optionally, the status indicators 36 may be used without the starting indicators 34. Additionally or alternatively, the status indicators 36 may display different information than the starting indicators 34. For example, in one embodiment the status indicators include a display to show one or more of a retrieval time and a reaction time for dogs involved in a race in each lane 28, 30 of the assembly 2. The status indicators 36 may also include a speaker to output sounds generated by the control system 70. Optionally, the status indictors 36 may include three lights. Each light may be associated with one of a ready, set, and go signal. In one embodiment, a first lane status indicator 36A is associated with the first lane 28 and a second lane status indicator 36B is associated with the second lane 30. The first and second lane status indicator 36A, 36B may be separately controllable by the control system 70. In this manner, the first and second lane status indicator 36A, 36B may provide start signals at the same or different times and may provide different information associated with each lane. Thus, the first lane status indicator 36A may provide a start signal before or after the second lane status indicator 36B provides a start signal.

Optionally, one or more ramps 68 may be provided for the dogs to exit the container 40. The ramps 68 may be arranged in any manner and may be of any size or shape. In one embodiment, the ramps 68 are covered with a soft material to improve traction and reduce slipping. In another embodiment, the ramps are covered by a non-slip material. The material may comprise rubber, artificial grass, or similar materials.

Additionally, a second platform (not illustrated) may be positioned proximate to an exterior of the container 40. In one embodiment, the second platform may be positioned proximate to the object 60. The second platform may have any desired size. In one embodiment, the second platform has size and strength suitable to hold at least one person, such as a photographer or a race official. Optionally, a barrier may be provided outside of the container 40 proximate to the object 60. In one embodiment, the barrier comprises a fence that prevents people from approaching within about 5 feet of the ends of each lane.

Figure 4:
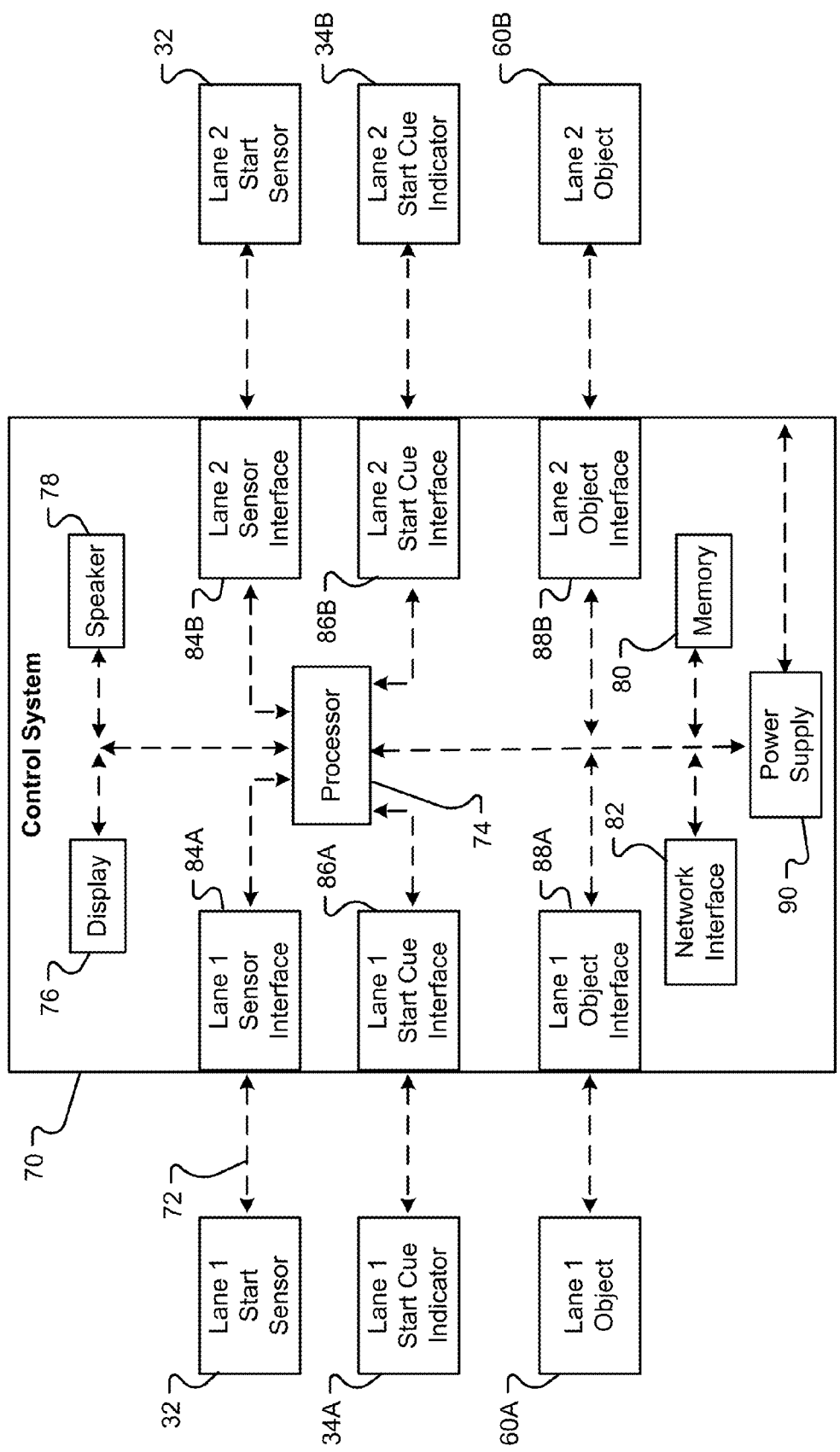
FIG. 4 is a schematic view of a control system of the present disclosure.

Referring now to FIG. 4, a control system 70 of one embodiment of the present disclosure is illustrated. The control system 70 may comprise a computing device 104 as described in conjunction with FIG. 5. The control system generally includes a processor 74, a display 76, memory 80, software modules stored in the memory, start sensor interfaces 84 for each lane, start cue interfaces 86 for each lane, and an object interface 88 for each lane, and a power supply 90. Optionally, the control system 70 may also include a speaker 78 and a network interface 82.

The control system 70 can also include various other components or software modules operable to conduct different operations. For example, the control system 70 can include a network interface 82. The network interface 82 can be any interface to a network, such as the internet. The network interface 82 can include an interface to any type of landline or other communication system including a plain old telephone system (POTS), a public switch telephone network (PSTN), a local area network (LAN), a wide area network (WAN), a wireless LAN, a wireless WAN, or other types of networks that may conduct communications. The network interface 82 can be any hardware and/or software operable to conduct communications over these various types of networks. Thus, the network interface can change communications or format communications in any protocol or format that is sent over these different networks. For example, the network interface 82 may format communications in hypertext transfer protocol (HTTP), realtime transport protocol (RTP), session initiation protocol (SIP), or other types of protocols.

The control system 70 may include software modules that may be executed by the processor 74 and stored in memory 80. The modules may include one or more of a rules module, a registration module, and a race module.

The rules module includes computer operable instructions adapted to control one or more of scheduling the order of teams in a race, lane assignments for teams, qualifying rounds for teams, final rounds for teams, elimination of teams, byes for race teams, disqualification of race teams, penalties for false starts, starting box violation penalties for teams, lane violation penalties, and tie-breaking between teams with tied scores. The rules module may retrieve rules from a database. The rules may include Dueling Dogs™ Rules & Policies available at https://duelingdogs.net/rules-policies/, which are incorporated herein by reference in their entirety.

The registration module is operable to register one or more race teams. The registration module may receive and record one or more of handler names, team names, dog names, logins, and passwords. The registration module may also receive and record contact information for the handler and/or the team such as, but not limited to, a phone number, an address, and an email address. Additionally, the registration module may be operable to accept electronic payment from teams.

The race module is operable to send and receive signals to each of the start sensors 32, start indicators 34, status indicators 36, and objects 60 interconnected to the control system 70. For example, the race module is operable to receive a signal from the start sensor for a lane when a dog passes the start line 14. The race module can generate signals to be sent to the start indicators, such as ready, count down, and start to the start cues. Further the race module can send signals to activate one or more lights or audio signals of the start cue 34, status indicators 36, and/or the objects 60. The control system may control each of the start cue 34, status indicators 36, and the objects 60 of each lane individually. Thus, start signals may be provided by the start cue 34 and/or the status indicators 36 for each lane at the same or different times. Additionally, the race module may receive a signal from the object 60. In one embodiment, the object 60 for each lane includes two signal paths to the control system 70. Each of the two signal paths of each object 60 is adapted to be interrupted when a dog moves the object a predetermined distance. Said another way, to stop the race clock, the dog must move the object 60 a predetermined distance with enough force to sever the two signal paths.

Once a race starts, the race module starts a timer associated with each lane 28, 30 to record a reaction time for a dog in each lane. The reaction time comprises the time from when the race starts (when a start signal is provided by the start cue 34 and/or the status indicators 36) until the dog in each lane crosses the start line 14. When a dog crosses the start line of its lane, the race module starts a second timer to record a retrieval time for the dog. The second timer continues to run until each of the two signal paths of the object are disconnected from the control system. Said another way, the retrieval time measures the time from when the dog crosses the start line until the dog disconnects the object from the control system.

The power supply 90 may be of any type known to those of skill in the art. In one embodiment, the power supply 90 for the control system 70 comprises a triple step-down switching regulator. The power supply may be an LT3514, consisting of three buck regulators with an input of about 15 volts and a three channel output supplying about 3.5V, 5V, and 12V. The power supplied by the power supply may operate the interfaces required by the timing circuit, including the objects 60, starting indicators 34, status indicators 36, and start line sensors 32, as well as the inputs (such as switches, keyboard, a start switch, a reset switch, etc) outputs or user interfaces (such as a display), and the processor of the control system.

In one embodiment, the processor 74 is a microcontroller such as a high-performance, 16-bit digital signal controller. For example, the processor may be a dsPIC30F6010A which runs on a 5V power input, which may be provided by the power supply unit, and receives input from the objects 60, status indicators 36, starting indicators 34, start line sensors 32, as well as the inputs and user interfaces of the control system. The microcontroller may be programmed to operate the race module and allow an operator to control the timing system, start lights and LCD screen using a user interface, such as a keypad.

Additionally or alternatively, the control system may include a USB 2.0 interface. In one embodiment, the USB 2.0 interface may be used to program the microcontroller. For example, the USB 2.0 may communicate with an UART Protocol Converter connected to the microcontroller, for example an MCP2200 device. Also connected to the microcontroller may be a keyboard for operating the program, and an LCD screen for displaying the timing system functions.

Figure 5:
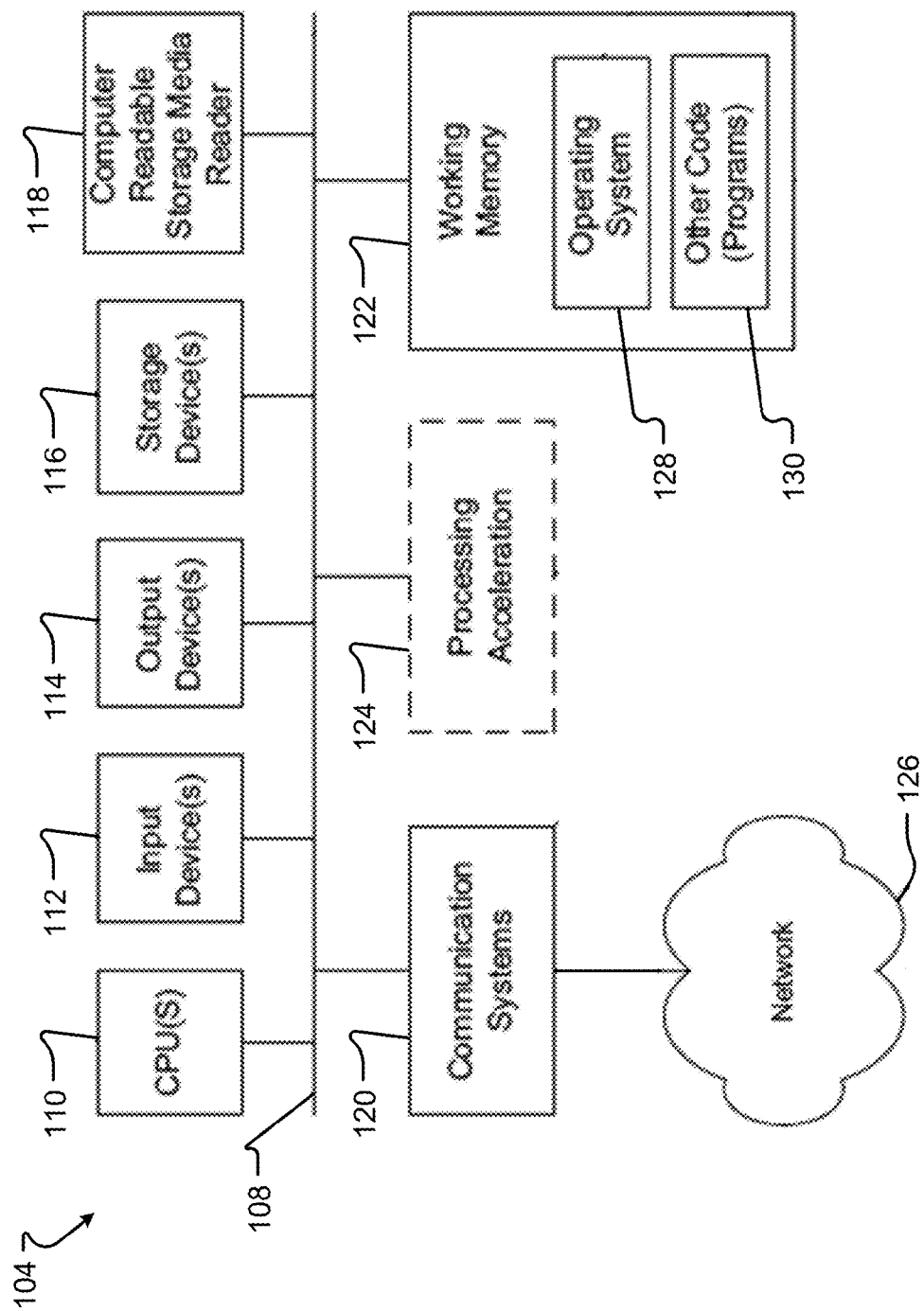
FIG. 5 is a schematic view of an example data processing system that may be used in conjunction with embodiments of the present disclosure.

Referring now to FIG. 5, an example data-processing system 104 is provided that may be used in connection with the race assembly 2 and the control system 70 disclosed herein. More specifically, FIG. 5 illustrates one embodiment of a data-processing system 104 upon which the control system or components of the control system may be deployed or executed. The data-processing system 104 is shown comprising hardware elements that may be electrically coupled via a bus 108. The hardware elements may include one or more central processing units (CPUs) 110; one or more input devices 112 (e.g., a mouse, a keyboard, a touch sensitive display, etc.); and one or more output devices 114 (e.g., a display device, a printer, a speaker, lights, etc.). The data-processing system 104 may also include one or more storage devices 116. By way of example, storage device(s) 116 may be disk drives, optical storage devices, solid-state storage device such as a random access memory ("RAM") and/or a read-only memory ("ROM"), which can be programmable, flash-updateable and/or the like.

The data-processing system 104 may additionally include a computer-readable storage media reader 118; a communications system 120 (e.g., a modem, a network card (wireless or wired), an infra-red communication device, etc.); and working memory 122, which may include RAM and ROM devices as described above. In some embodiments, the data-processing system 104 may also include a processing acceleration unit 124, which can include a DSP, a special-purpose processor and/or the like.

The computer-readable storage media reader 118 can further be connected to a computer-readable storage medium, together (and, optionally, in combination with storage device(s) 116) comprehensively representing remote, local, fixed, and/or removable storage devices plus storage media for temporarily and/or more permanently containing computer-readable information. The communications system 120 may permit data to be exchanged with the network 126 and/or any other data-processing described above with respect to the control system 70.

The data-processing system 104 may also comprise software elements, shown as being currently located within the working memory 122, including an operating system 128 and/or other code 130, such as program code for operating the control system 70 or components of the aquatic race assembly 2. It should be appreciated that alternate embodiments of a data-processing system 104 may have numerous variations from that described above. For example, customized hardware might also be used and/or particular elements might be implemented in hardware, software (including portable software, such as applets), or both. Further, connection to other computing devices such as network input/output devices may be employed.

Figure 6:
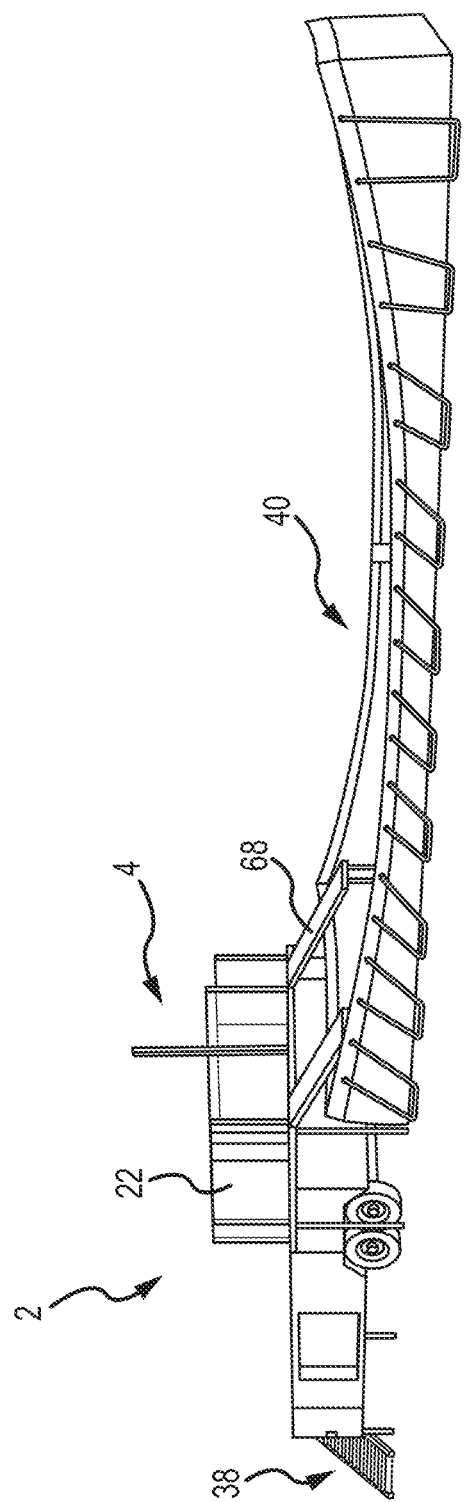
FIG. 6 is a front elevation view of an aquatic race assembly of another embodiment of the present disclosure and illustrating a water container prior to assembly.

Referring now to FIGS. 6-11, additional features of aquatic race assemblies of embodiments of the present disclosure are illustrated. Referring now to FIG. 6, a race assembly 2 is illustrated in a disassembled state. The platform 4 is illustrated interconnected to wheels. A storage area is provided under the platform. A ramp or stairs 38 may be positioned proximate to the platform to enable race participates to climb to the upper surface of the platform. It will be appreciated the stairs 38 may be positioned in a variety of locations with respect to the platform.

The container 40 is illustrated in a collapsed or disassembled state before being filled with water. U-shaped support elements proximate to a longitudinal side of the container are illustrated prior to being place in a substantially vertical orientation.

Referring now to FIG. 7, assemblies 92 for positioning objects 60 in each of the lanes 28, 30 are illustrated. The assemblies include an adjustable arm 94 that can be raised or lowered to adjust the position of the objects with respect to the surface of the water 42. A flexible member, such as a cord or wire 58, may be used to suspend the objects 60 from the arm 94. Signal transmitting cables 72 used to interconnect the objects 60 to the control system 70 may be held in a predetermined position by the assemblies 92. Additionally or alternatively, indicators 36 for each lane may be held in a predetermined position by the assemblies 92. For example, the lane indicators 36 may be interconnected to arms 94 and interconnected to the cables 72 associated with each lane.

FIG. 7 also shows an embodiment of the container partition 50. As illustrated, in one embodiment, the container partition 50 is at least partially transparent. A bumper 54 is positioned on the upper portion of the partition. The embodiment of the container partition 50 illustrated in FIG. 7 is adapted to prevent a dog from moving from one lane to the other lane.

Referring now to FIG. 8, a view of the top portion of the platform 4 is illustrated. One embodiment of the platform partition 22 is shown. As described above, the partition 22 is similar to container partition and is at least partially transparent. The top portion of the platform 4 is covered in a non-slip material, such as rubber or artificial grass.

FIG. 9 illustrates another perspective view of a portion of the platform and the container. Ramps 68 of one embodiment are illustrated in one position of use. The ramps 68 extend at least partially below the surface of the water 42 to enable dogs in each lane to climb out of the container onto the platform 4.

FIG. 9 also illustrates the relative position of the starting area 12 and starting line 14 with respect to the platform end 8. The platform end 8 is positioned a predetermined height above the surface of the water 42.

Figure 10:
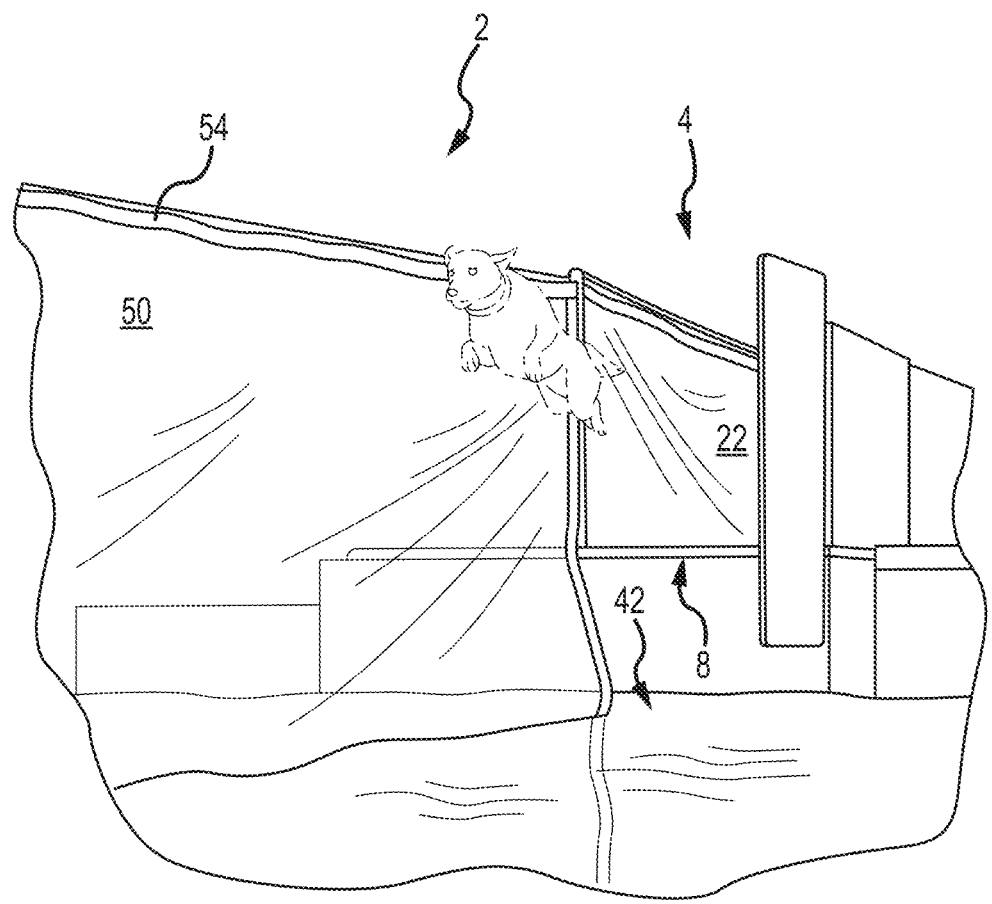
FIG. 10 is a back right perspective view of still another aquatic race assembly illustrating the position of a platform with respect to the surface of the water in the container.

FIG. 10 illustrates another view of the arrangement of the platform end 8 relative to the surface of the water 42. As previously described, in one embodiment, the platform is approximately 2 feet above the surface of the water.

Figure 11:
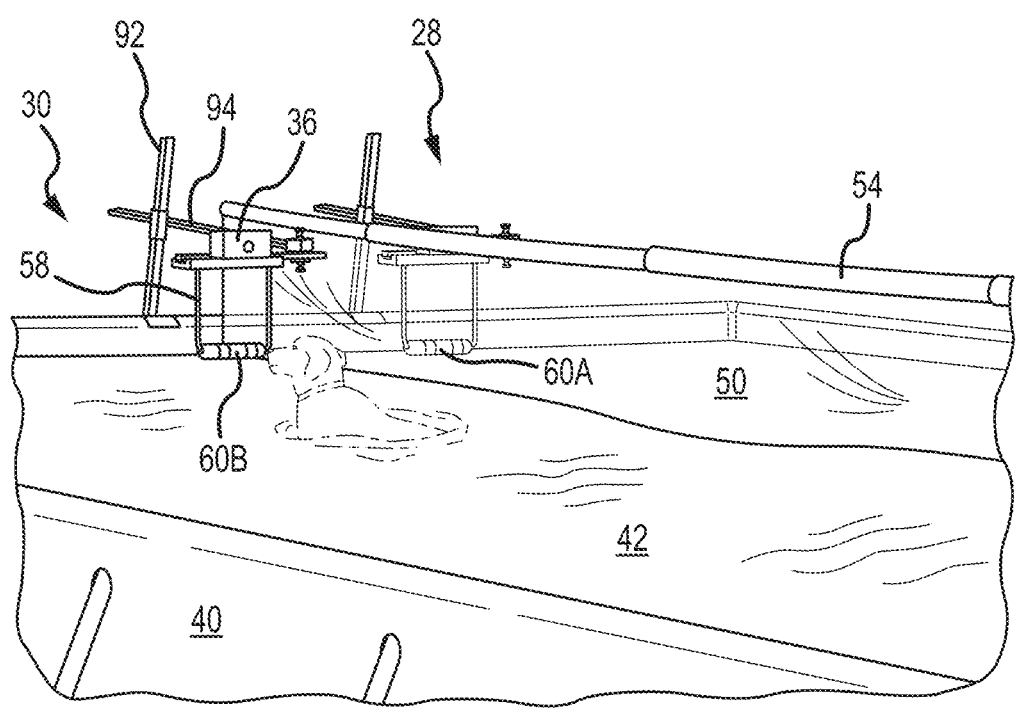
FIG. 11 is another back perspective view of an aquatic race assembly illustrating an arrangement of objects positioned above the surface of the water in each lane of the race assembly.

FIG. 11 illustrates an arrangement of the objects 60A, 60B associated with each lane 28, 30. The objects are positioned proximate to an end of the container 40 distal to the platform end 8. Assemblies 92 are used to adjust the height of the objects 60 above the surface of the water 42. Optionally, each assembly 92 may include a lane status indicator 36. FIG. 11 also illustrates a dog in lane 30 swimming toward object 60B.

Figure 12:
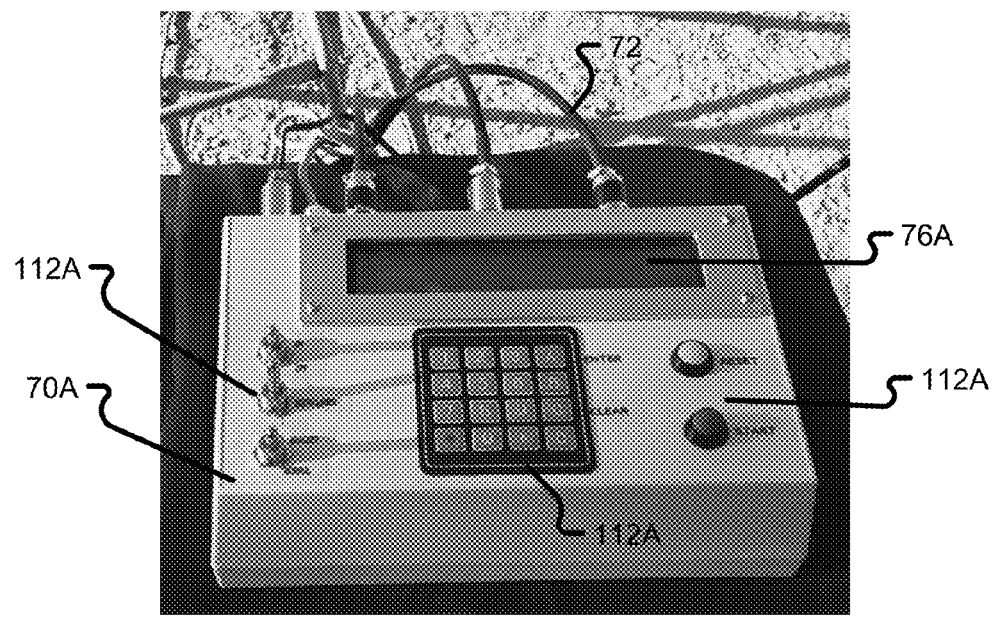
FIG. 12 is a top front perspective view of a control system of one embodiment of the present disclosure.
Figure 13:
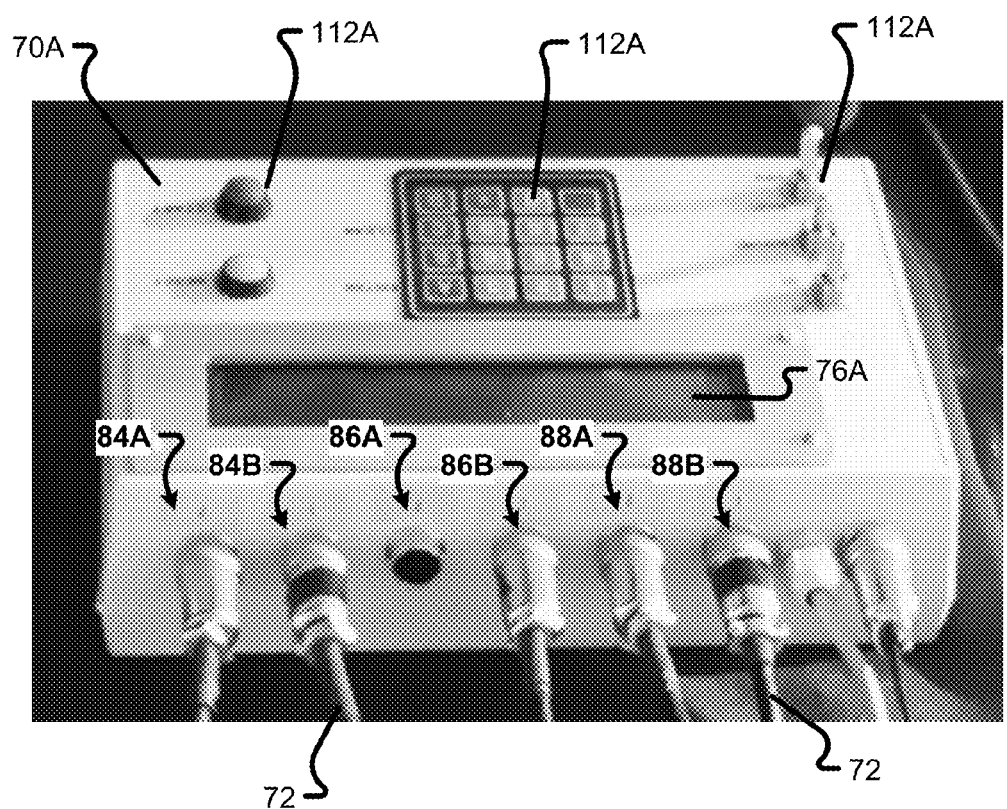
FIG. 13 is a top rear perspective view of the control system of FIG. 12.

Referring now to FIGS. 12-13, an embodiment of a control system 70A of one embodiment of the present invention. The control system generally includes a display 76A, interfaces 84-86, and input devices 112A. In one embodiment, the display 76A comprises an LCD screen. The input devices may include, but are not limited to, a keyboard or number pad and one or more switches and buttons. The switches may control a variety of functions. For example, the switches may include an "on/off" switch, a lane control switch operable to select control of one or more of lanes 28, 30, and a switch to control races brackets. The buttons may include a start button to start a race and a reset button to cancel a race. The keyboard may include an enter key and a clear or delete key.

As shown in FIG. 13, interfaces 84, 86, 88 for the start sensors, start cues, and object are provided for each lane. Although inputs are only shown for two lanes, it will be appreciated that the control system may include inputs for any number of lanes. In one embodiment of the present invention, the interfaces for the sensor, start cue, and object have a different shape or input configuration. For example, a first interface may have a 4-pin input, a second interface a 5-pin input, and a third interface a 6-pin input. In another embodiment, a first interface may have a first shape, a second interface a second shape, and a third interface a third shape. Additionally or alternatively, cables for each lane may have different indicia. In one embodiment, the cables for a first lane have a first indicia and the cables for a second lane have a second indicia. The indicia may comprise one or more of a color, letters, and numbers.

The control system 70A may comprise different devices. In one embodiment, the control system 70A is a laptop computer. In another embodiment, the control system 70A is a smart phone, such as an Apple iPhone, a Samsung Galaxy or Note, or any other type of smart phone. In still another embodiment, the control system 70 is a tablet computer, such as, but not limited to, an iPad, a Microsoft Surface, or a Samsung Galaxy Tab or Tablet of any type.

Figure 14:
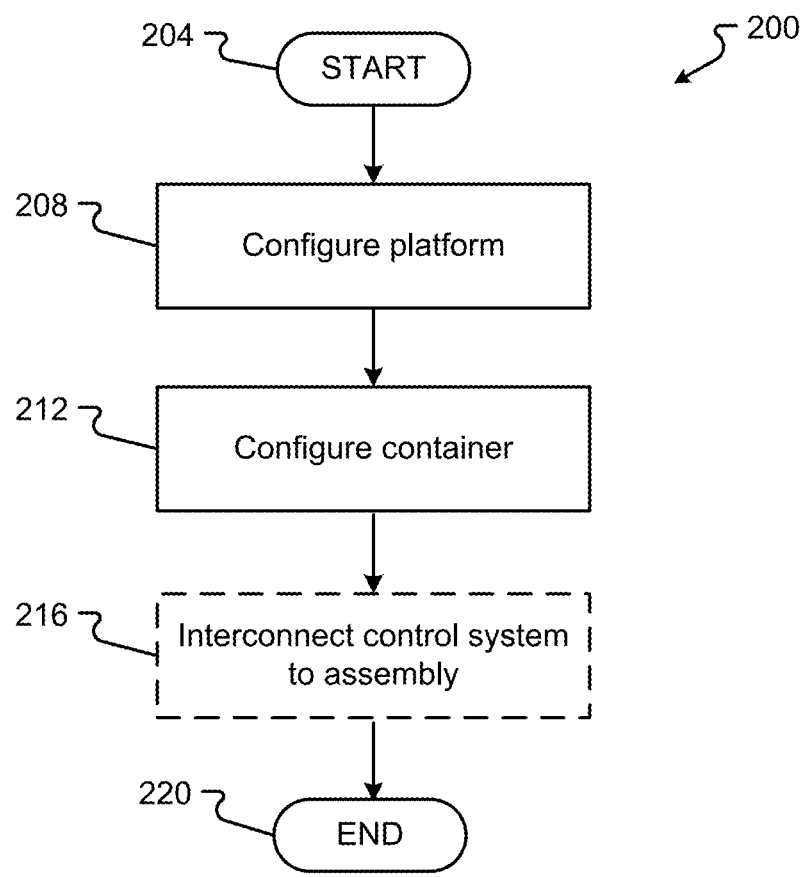
FIG. 14 is a flow diagram of a method of assembling an aquatic race assembly according to one embodiment of the present disclosure.

Referring now to FIG. 14, an embodiment of a method 200 for configuring an aquatic race assembly is generally shown. While a general order of the steps of the method 200 is shown, the method 200 can include more or fewer steps or can arrange the order of the steps differently than those shown in FIG. 14. Although the operations of the method may be described sequentially, many of the operations may in fact be performed in parallel or concurrently. In addition, the order of the operations may be re-arranged without departing from the spirit of embodiments of the invention. Generally, the method 200 starts with a start operation 204 and ends with an end operation 220. Hereinafter, the method 200 shall be explained with reference to the race assemblies, components, and controllers described in conjunction with FIGS. 1-13.

The platform 4 is configured in operation 208. This may include assembling the platform and positioning the platform a predetermined height above a body of water. In one embodiment, a partition 22 is interconnected to the platform. The partition may merely indicate a dividing line between the two lanes. Optionally, the partition may form a barrier sufficient to prevent movement of dogs between the two lanes 28, 30.

In operation 212, the water container 40 is configured. This may include, but is not limited to, assembling the container, arranging container support elements, filling the container with water, and positioning at least one object 60 in a predetermined area of the container. Optionally, a container partition 50 may be installed in the container. Similar to partition 22, the container partition may merely indicate the dividing line between the two lanes. However, the container partition 50 may optionally form a barrier sufficient to keep dogs from crossing from one lane to the other lane. The configuration 212 of the container may also include installing one or more ramps 68 in the container.

Optionally, in operation 216, a control system may be interconnected to the assembly 4. As described above, the control system 70 may be in communication with, and operable to control, one or more of a start sensor 32, and a starting indicator 34, status indicators 36, and the objects 60.

Figure 15:
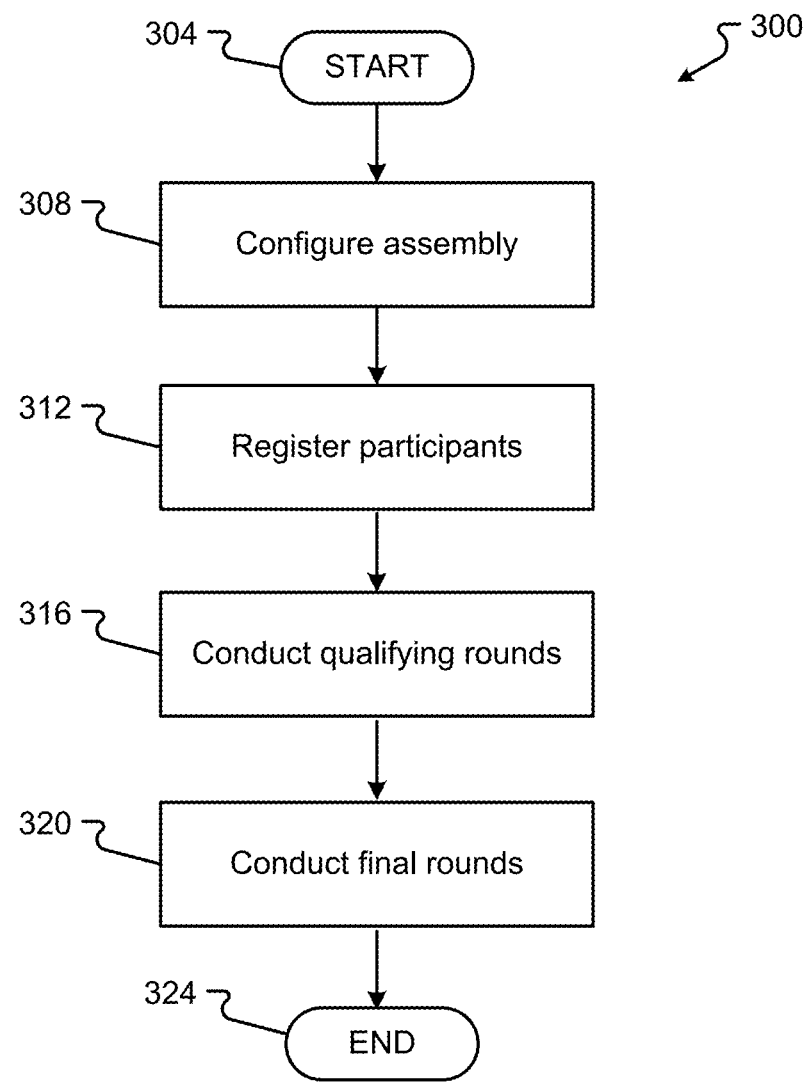
FIG. 15 is a flow diagram of a method of conducting an aquatic race using an aquatic race assembly of the present disclosure.

Referring now to FIG. 15, an embodiment of a method 300 for conducting a canine race using an aquatic race assembly 2 according to an embodiment of the present disclosure is generally shown. While a general order of the operations of the method 300 is shown in FIG. 15, the method 300 can include more or fewer operations or can arrange the order of the operations differently than those shown in FIG. 15. Although the operations of the method may be described sequentially, many of the operations may in fact be performed in parallel or concurrently. In addition, the order of the operations may be re-arranged without departing from the spirit of embodiments of the invention. Generally, the method 300 starts with a start operation 304 and ends with an end operation 324. The method 300 can be executed as a set of computer-executable instructions executed by a computer system and encoded or stored on a computer readable medium. Hereinafter, the method 300 shall be explained with reference to the race assemblies, components, methods, and controllers described in conjunction with FIGS. 1-14.

The assembly is configured in operation 308. In one embodiment, configuring the assembly comprises performing method 200 as described above. In one embodiment, configuring the assembly 308 comprising interconnecting a control system 70 to the assembly 2.

Teams are registered in operation 312. It will be appreciated that teams may be permitted to register prior to the day and time of the event. The registration 312 may comprise receiving information from team participants over a network 126 such as the internet. Optionally, teams may register in person at the site of the race. Teams may be charged different amounts for registering in advance compared to the amount charged for registering in person the day of the event. In one embodiment, teams are charged more to register the day of the event. Additionally or alternatively, a cut-off time may be set after which teams may not register. Optionally, the number of teams that may register for a race may be limited to a predetermined number. In one embodiment, up to 120 teams are permitted to register for one race. A team comprises a dog and a handler. A handler may register multiple teams for any number of dogs; however, after registering, neither the handler nor the dog of a team may be changed. The registration may optionally be performed by the control system 70.

In operation 316, the registered teams compete in qualifying rounds. In one embodiment, at least two teams compete substantially simultaneously in each race. Each race comprises a dog entering the starting area 12 with the dog's paws between the starting line 14 and the second line 16, the dog crossing the starting line 14 to start the timer associated with its lane, the dog moving to the platform end 8, swimming through the water 42, and grasping and pulling the object 60 to stop the timer. The teams each race a predetermined number of times. In one embodiment, each registered team can race only one time; however, it will be appreciated that each team may be allowed to race any number of times during the qualifying rounds. If an odd number of teams are registered for a round, the control system may randomly select a second team to race as a bye team. The second team's time will be counted for advancement.

Optionally, the control system 70 may start each qualifying round and record the reaction time and the retrieval time for each team during races of the qualifying round. In one embodiment, the control system conducting a qualifying round or other race comprises: (1) provides an instruction to the starting indicator to provide a start signal; (2) receives a first signal from a sensor when a dog in a lane of the assembly crosses a start position on a platform of the assembly; (3) determines a reaction time for the dog, the reaction time comprising an amount of time that has elapsed from when the start signal is provided until the first signal is received; (4) receives a second signal when the dog disconnects a lure in the lane from the control system, the lure positionable a predetermined distance above a surface of the water; (5) determines a retrieve time for the dog, the retrieve time comprising an amount of time that has elapsed between receipt of the first signal and receipt of the second signal; and (6) determines which dog in the dog race is the fastest based on at least one of the retrieve time and the reaction time of each dog.

No portion of the dog's body or the handler's body may cross the starting line 14 before a start signal is displayed or sounded. The control system 70 may determine that a dog or handler crossed the start line prior to the start signal and thus had a false start. A team may also receive a false start if the dog's paws are not within the starting area 12 when the start signal is indicated on the indicator 34 or the status indicators 36. If a dog crosses out of its lane (or interferes with a team in the other lane) the dog's team is disqualified for the round and receives no time for that round. Any dog that crosses lanes or interferes with another team two times is disqualified from the competition. The other team will get to re-run the round against a randomly selected bye team. The handler may restrain or hold the dog prior to the start signal. In one embodiment, when a dog has a false start, the team receives a score of zero for that race. In one embodiment, the team with the false start is not allowed to re-run the race.

In one embodiment, a team may not race another team more than once during the qualifying rounds. When two teams race against each other more than once in the qualifying rounds, each team will receive a disqualification for the second race.

Optionally, a team may be permitted to participate in an additional race during a qualifying round by paying a predetermined fee. In one embodiment, the opportunity to participate in an additional race may only offered if there are unfilled slots in the particular qualifying round.

The control system 70 can determine the teams with the fastest retrieval times in operation 316. In one embodiment, if two or more teams have identical retrieval times, the control system 70 may use a tie-break algorithm to determine which team will advance. In one embodiment, the control system uses the reaction time to determine which team with a tied score advances. The reaction time comprises a time between when a race started and when a dog crosses the start line. Said another way, the reaction time measures how quickly a dog reacts to the start signal and crosses the start line. Accordingly, in a tie break, the control system may select a team with a faster reaction time to advance over a team with a slower reaction time.

A predetermined number of teams can advance to a final round. In one embodiment, the fastest sixteen teams of the qualifying round 316 will advance to the final round 320. However, it will be appreciated that any number of teams may be selected to advance to the final round.

A handler may qualify for multiple finals in different classes with different dogs. However, the handler may not compete in a final for a single class with more than one dog. If a handler qualifies for the final for a single class with more than one dog, the handler can select a single dog to compete with in the final. Similarly, a dog may qualify for multiple class finals with different handlers but may not compete in a single class final with more than one handler.

In the final round 320, each team will race in an elimination format. In one embodiment, during the final round, at least two teams race substantially simultaneously. After each race the team with a slower time is eliminated. In one embodiment, the control system 70 seeds the teams in races in the final round such that the fastest team is paired with the slowest team. Accordingly, if 16 teams qualify for the final round, the races of the first final round will pair: team 1 v. team 16; team 2 v. team 15; team 3 v. team 14, and so on. Individual races of the final round may be conducted in any order. For example, in one embodiment, the races of final round are ordered from slowest to fastest. In this manner, the teams with the 9th and 8th fastest times will race first and the teams with the 1st and 16th fastest times will race last. In another embodiment, the races of the final round are ordered from fastest to slowest such that the teams with the 1st and 16th fastest time will race first. In yet another embodiment, the races of the final round are conducted in a random order.

The final round may include each team racing only one time. After all teams in the final round have participated in one race of the final round, the team with the fastest time is the winner.

In another embodiment, the final round is conducted in an elimination format. In the elimination format, the team with the fastest time after each individual race of two teams advances to a subsequent round. In this manner, the first elimination round includes sixteen teams competing in eight races of two teams. The second elimination round includes eight winners of the first elimination round competing in four races of two teams. The third elimination round includes the four winners of the second elimination round competing in two races of two teams. The final elimination round comprises the two winning teams of the third elimination round in a single race of two teams.

Optionally, in one embodiment, a team with a false start in a race during the final round is eliminated. If two teams in one round both have false starts, each of these teams is eliminated. In one embodiment, if there is a tie between two teams in one race, the system controller may use the reaction time, described above, to determine which team will advance. Each team in the final round will race in head-to-head races until one team remains. The method then ends 324.

While various embodiments of the present disclosure have been described in detail, it is apparent that modifications and alterations of those embodiments will occur to those skilled in the art. It is to be expressly understood that such modifications and alterations are within the scope and spirit of the present disclosure. Further, the present disclosure is capable of other embodiments and of being practiced or of being carried out in various ways.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

A number of variations and modifications of the disclosure can be used. It would be possible to provide for some features of the disclosure without providing others.

What is claimed is:

1. An automated aquatic race assembly, comprising:
   a platform having an end;
   a start position on the platform;
   a container adapted to be filled with water and located proximate to the end of the platform;
   a partition adapted to define two lanes that extend from the start position to a predetermined distance from the start position;
   a lure, positioned at a predetermined distance above a surface of the water, comprising:
     a first object positioned a predetermined distance from the start position in a first lane, and
     a second object positioned a predetermined distance from the start position in a second lane,
     wherein the first and second objects are adapted to be bitten by a dog in each lane;
   a sensor in each lane that detects a predetermined event in each lane and sends a signal to a control system, wherein the sent signals indicate a time when a dog in the lane has crossed the starting line on the platform in the corresponding lane; and
   a control system having at least one processor and a non-transitory computer readable medium storing computer instructions that when executed:
     process a first signal from the sensors indicating a start of an event for each lane,
     process a plurality of signals from the lure when the dog in each lane disconnects the object in that lane from the control system, and
     determine a reaction time for the dog in each lane and whether the dog has crossed a starting line in the lane prior to the start of an event, indicating a false start.

2. The assembly of claim 1, wherein, upon receipt of the signal from the sensors, the control system executes computer instructions that when executed measure a travel time for the dog in each lane, to travel the predetermined distance to the lure object in the lane.

3. The assembly of claim 2, wherein the first and second objects are releasably interconnectable to the control system, and wherein the control system is operable to measure the travel time upon receipt of the signal from the sensor until the dog releases the object in its lane from the control system.

4. The assembly of claim 2, further comprising a starting indictor operable to provide a start signal to begin a race, wherein said start signal is provided at different times for each lane.

5. The assembly of claim 4, wherein the control system is operable to measure a reaction time from when the start signal is provided by the starting indicator until receipt of the signal from the sensor in each lane, wherein the start signal is provided at different times for each lane.

6. The assembly of claim 1, wherein
   the start position is approximately 20 feet from the platform end;
   the container is adapted to be filled with water so that a top surface of the water is about 2 feet below a top surface of the platform;
   the first and second objects are positionable approximately 38 feet from the platform end; and
   the first and second objects are positionable to be approximately 2 inches above the top surface of the water.

7. The assembly of claim 1, wherein the platform is between about 4 feet and about 12 feet wide and at least about 28 feet long.

8. The assembly of claim 1, wherein said assembly is portable and adapted to be disassembled and transported on a vehicle, and wherein the platform may be interconnected to a set of wheels for portability.

9. The assembly of claim 1, wherein the container is about the same width as the platform and is at least about 3 feet deep.

10. The assembly of claim 1, wherein the partition comprises a first partition for the platform and a second partition for the container.

11. The assembly of claim 1, wherein the partition is substantially transparent.

12. The assembly of claim 11, wherein the partition is planar and comprises one of a flexible material and a substantially rigid material.

13. A method of conducting a dog race using an aquatic race assembly according to claim 1, comprising the steps of:
   configuring the aquatic race assembly, the assembly including:
     the platform with a start position a predetermined distance from an end of the platform;
     the container filled with water and positioned proximate to the platform end;
     the partition defining a first lane and a second lane in the aquatic race assembly; and the first object in the first lane and the second object in the second lane,
wherein the first and second objects positioned proximate to the water a predetermined distance from the start position,
wherein the first and second objects are adapted to be grasped by a dog; and
conducting a race with the assembly,
wherein the race includes two dogs leaving the start position, moving from the platform into the water, and moving in the water towards the object in each dog's lane.

14. The method of claim 13, further comprising:
determining which of the two dogs is fastest by measuring a travel time for each dog, the travel time comprising an amount of time for a dog to travel the predetermined distance and engage the object in its lane.

15. The method of claim 14, wherein determining the fastest dog further comprises:
measuring a reaction time for each dog, the reaction time comprising an amount of time that has elapsed from when a start signal is provided until the dog leaves the start position, wherein if the two dogs have identical travel times, the fastest dog is the dog with the lowest reaction time.

16. The method of claim 15, wherein the control system measures the travel time and the reaction time for each of the two dogs.

17. The method of claim 16, wherein the control system is in communication with the starting indicator sensor in each lane, that provide the start signal, and with the first and second objects.

18. The method of claim 17,
wherein the control system is in communication with the sensors that can detect a predetermined event and send the signal to the control system,
wherein the control system measures the travel time upon receipt of the signal from the sensor, wherein the start position is approximately 20 feet from the platform end, and
wherein the first and second objects are positioned approximately 38 feet from the platform end.

19. A non-transitory computer readable medium having stored thereon instructions that cause a processor of a control system to conduct a dog race using an aquatic race assembly according to claim 1, including two lanes and a platform with an end positioned proximate to a body of water, and a lure in each lane, comprising:
an instruction to provide a start signal;
an instruction to receive a first signal from a sensor in each lane when the sensor detects a predetermined event;
an instruction to determine a reaction time for a dog in a lane, the reaction time comprising an amount of time that has elapsed from when the start signal is provided until the first signal is received;
an instruction to receive a second signal when the dog disconnects the lure in the lane from the control system, the lure positionable a predetermined distance above a surface of the water;
an instruction to determine a retrieve time for the dog, the retrieve time comprising an amount of time that has elapsed between receipt of the first signal and receipt of the second signal; and
an instruction to determine which dog in the dog race is the fastest based on at least one of the retrieve time and the reaction time of each dog.

20. The non-transitory computer readable medium of claim 19, wherein:
the start position is approximately 20 feet from the platform end; and the lure in each lane is approximately 38 feet from the platform end, wherein the dog must move from the platform into the water and swim through the water to disconnect the lure in its lane from the control system.

* * * * *